United States Patent
Beitchman et al.

(10) Patent No.: US 11,055,352 B1
(45) Date of Patent: Jul. 6, 2021

(54) ENGINE INDEPENDENT QUERY PLAN OPTIMIZATION

(71) Applicant: Amazon Technologies, Inc., Seattle, WA (US)

(72) Inventors: Marc Howard Beitchman, Seattle, WA (US); Andrew Edward Caldwell, Santa Clara, CA (US); Rahul Sharma Pathak, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 806 days.

(21) Appl. No.: 15/617,901

(22) Filed: Jun. 8, 2017

(51) Int. Cl.
*G06F 16/9032* (2019.01)
*G06F 16/14* (2019.01)
*G06F 16/903* (2019.01)

(52) U.S. Cl.
CPC .......... *G06F 16/9032* (2019.01); *G06F 16/14* (2019.01); *G06F 16/90335* (2019.01)

(58) Field of Classification Search
CPC . G06F 16/9032; G06F 16/14; G06F 16/90335
See application file for complete search history.

(56) References Cited

U.S. PATENT DOCUMENTS

| | | | |
|---|---|---|---|
| 6,567,802 B1 | 5/2003 | Popa et al. | |
| 7,877,381 B2 | 1/2011 | Ewen et al. | |
| 7,984,043 B1 | 1/2011 | Waas | |
| 8,255,388 B1 * | 8/2012 | Luo | G06F 16/217 707/719 |
| 2006/0173865 A1 * | 8/2006 | Fong | G06F 40/151 |
| 2012/0191642 A1 * | 7/2012 | George | G06F 16/24542 707/602 |
| 2012/0284255 A1 * | 11/2012 | Schechter | G06F 16/24526 707/718 |
| 2014/0089294 A1 * | 3/2014 | Shankar | G06F 16/24524 707/718 |
| 2014/0172914 A1 * | 6/2014 | Elnikety | G06F 16/9024 707/774 |
| 2015/0006509 A1 * | 1/2015 | Shao | G06F 16/2246 707/719 |
| 2016/0140175 A1 * | 5/2016 | Weyerhaeuser | G06F 16/24542 707/718 |
| 2016/0154850 A1 * | 6/2016 | Bornea | G06F 16/24545 707/718 |

* cited by examiner

*Primary Examiner* — Cam Y Truong
(74) *Attorney, Agent, or Firm* — Robert C. Kowert; Kowert, Hood, Munyon, Rankin & Goetzel, P.C.

(57) ABSTRACT

Optimized query plans may be generated independent of the query engine that performs the optimized query plan. A request to generate an optimized query plan for a query may be received and a type of engine for performing the query may be identified. An initial plan may be generated in an engine-specific format for the type of engine that is translated into an optimization plan format. An analysis of the initial plan optimization plan format may be performed to generate an optimized query plan. The optimized query plan may be translated into the engine-specific format and sent in response to the request for the optimized query plan.

20 Claims, 17 Drawing Sheets

ENGINE INDEPENDENT QUERY PLAN OPTIMIZATION

BACKGROUND

Computing systems for querying of large sets of data can be extremely difficult to implement and maintain. In many scenarios, for example, it is necessary to first create and configure the infrastructure (e.g. server computers, storage devices, networking devices, etc.) to be used for the querying operations. It might then be necessary to perform extract, transform, and load ("ETL") operations to obtain data from a source system and place the data in data storage. It can also be complex and time consuming to install, configure, and maintain the database management system ("DBMS") that performs the query operations. Moreover, many DBMS are not suitable for querying extremely large data sets in a performant manner.

Computing clusters can be utilized in some scenarios to query large data sets in a performant manner. For instance, a computing cluster can have many nodes that each execute a distributed query framework for performing distributed querying of a large data set. Such computing clusters and distributed query frameworks are, however, also difficult to implement, configure, and maintain. Moreover, because different data may be stored in different locations, and accessible by different query processing frameworks or other query engines, query processing may be distributed across multiple different query processing resources. Techniques that can optimize the performance of a query independent of the type of query engine processing the query may be desirable.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of engine independent query plan optimization are described herein. Query plan optimizations may be performed in various embodiments to improve the performance of a query plan with respect to one or more features. For example, a cost-based optimization to a query plan that optimizes performance time may compare the time costs of different possible query plans to select the query plan that minimizes the performance time of a query, in one embodiment. Other features, such as balancing the distribution of work (e.g., across a distributed processing cluster) or minimizing the network bandwidth or storage bandwidth consumed may be similarly optimized, in some embodiments. Engine independent query plan optimization may be implemented to decouple the performance of query optimization from other query execution operations, allowing for greater numbers of resources to allocated to optimization modeling and decision-making, as well as allowing for rapid iteration and deployment optimization technique improvements, in various embodiments. Moreover, federated other types of distributed processing techniques for queries that utilize multiple different query engines may be optimized for performance independent of any one query engine used to process a query, in some embodiments.

Figure 1:
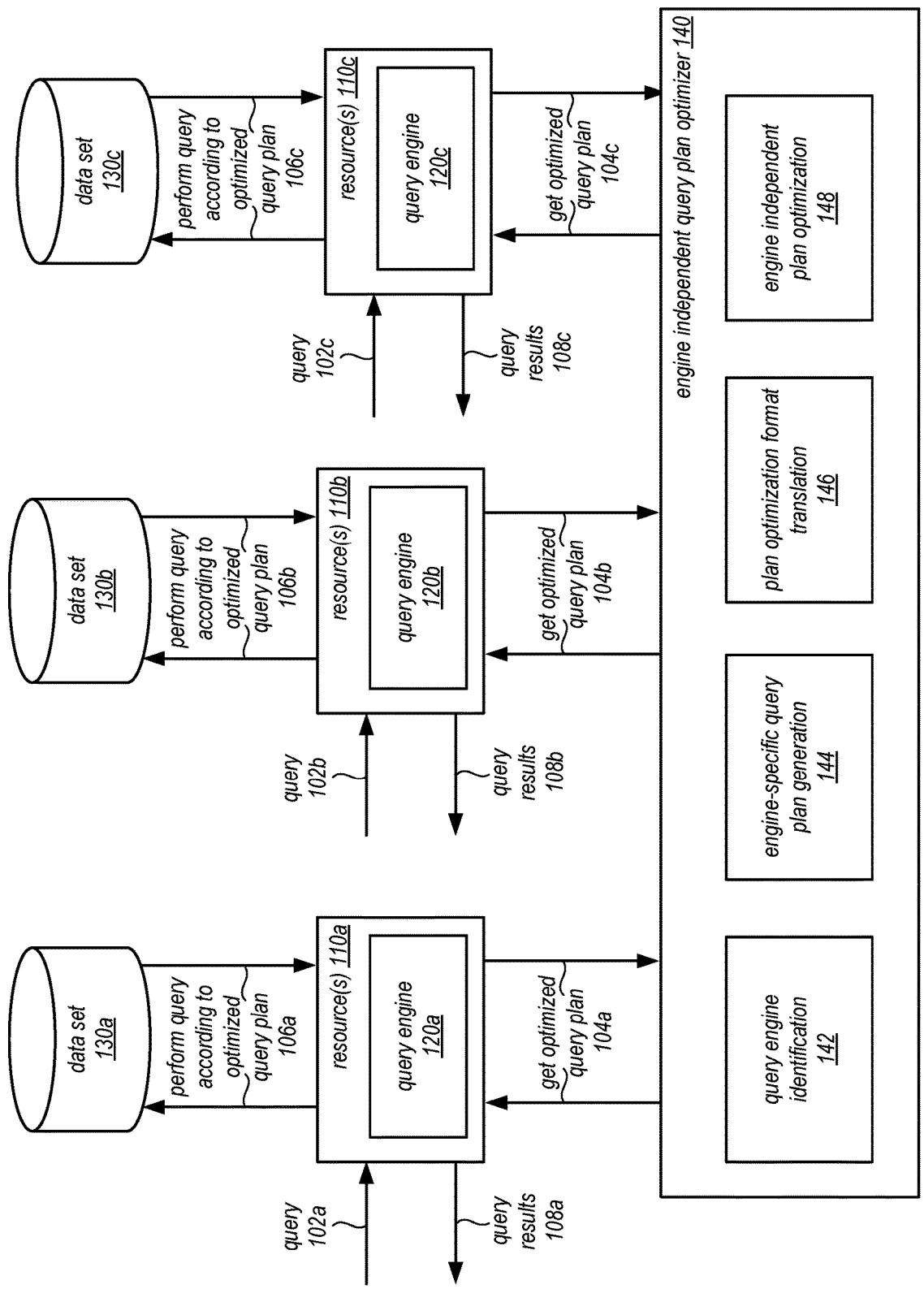
FIG. 1 illustrates a logical block diagram of engine independent query plan optimization, according to some embodiments.

FIG. 1 illustrates a logical block diagram of engine independent query plan optimization, according to some embodiments. Resources, such as resources 110a, 110b, and 110c, may be one or more computing resources that may be or include one or more nodes, instances, hosts, or other collections of computing resources (e.g., a cluster of computing resources) that implement a query engine 120, such as query engines 120a, 120b, and 120c, (e.g., a distributed query processing engine or framework) for executing queries with respect to data sets, 130a, 130b, and 130c (e.g., that may be remotely stored), in one embodiment. Resources 110 may be differently configured, in at least some embodiments, providing opportunities to offer different execution engines, platforms, services, or systems for queries. For example, query engine 120a may be a query engine that processes relational database requests (e.g., Structured Query Language (SQL) queries), while query engine 120b may be a non-relational data store that processes scans or other operations for objects based key values, in one embodiment.

Different queries, 102a, 102b, and 102c, may be received for processing at query engines 120, in some embodiments. The queries 102 may be directed to a data set, data sets 130a, 130b, or 130c, accessible to different query engine 120, in some embodiments. Queries 102 may be received via various types of interfaces (programmatic, user console, driver, etc.), in one embodiment. A query may be formatted according to different query languages, or specifications of query languages including Structured Query Language (SQL) and/or Hive Query Language (HQL), for relational data stores, APIs or other requests for non-relational data sets, or queries for other types of other types of schemas structures (or unstructured) data sets. In at least some embodiments, a single query may be submitted directed to a data set that includes portions or all of multiple data sets (e.g., portions or all of data set 130) which may be processed as multiple different queries (e.g., queries 102a, 102b, and 102c) that are sub-queries of the single query, in some embodiments. The query may include execution hints, specifying the type of query execution engine(s) to utilize, query execution limits, or other parameters or properties for configuring the execution of the query, in some embodiments. Data sets 130 be one or more data objects (e.g., database table), or other data structures that store data that may be accessed by queries 102, in various embodiments.

To process queries 102, query engines 120 may submit requests, 104a, 104b, and 104c, to get an optimized query plan for the query 102 from engine independent query plan optimizer 140, in various embodiments. Engine independent query plan optimizer 140 may implement query engine identification 142 to detect or otherwise identify the type of query engine for which the query is to be performed. In some embodiments, query engine identification 142 may identify multiple query engines types for a query (e.g., if queries 102a, 102b, and 102c were sub queries of a single query) in order to perform federated query processing.

Engine-specific query plan generation 144 may generate initial plan(s) to perform the query (or sub-queries) that is in a format specific to the type of engine to perform the query (or sub-queries). For example, engine-specific plan generation may utilize one format for query engine 120a and a different format for query engine 120b. Plan optimization format translation 146 may translate the initial plan(s) into a plan optimization format that can be analyzed by engine independent plan optimization 148 to perform various types of optimization, such as cost-based optimization, multi-objective optimization, among other optimization techniques, as discussed below with regard to FIGS. 8, 10, 11, and 13, in various embodiments. Plan optimization format translation 146 may then translate back the optimized query plan(s) and provide them to the respective query engines 120, in various embodiments. Query engines 120 may then perform the query according to the optimized query plan, 106a, 106b, and 106c, respectively and return results, 108a, 108b, and 108c for the queries (or sub-queries which may be aggregated into a single result or separately reported), in various embodiments.

Please note that the previous description of engine independent query plan optimization is a logical illustration and thus is not to be construed as limiting as to the implementation of query engines, data sets, or particular query plan optimization techniques.

This specification begins with a general description of a provider network that implements a query optimization service that provides optimized query execution plans for queries received from another network-based service, a managed query service. Then various examples of the managed query service and query optimization service (along with other services that may be utilized or implemented) including different components/modules, or arrangements of components/module that may be employed as part of implementing the services are discussed. A number of different methods and techniques to implement engine independent query plan optimization are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
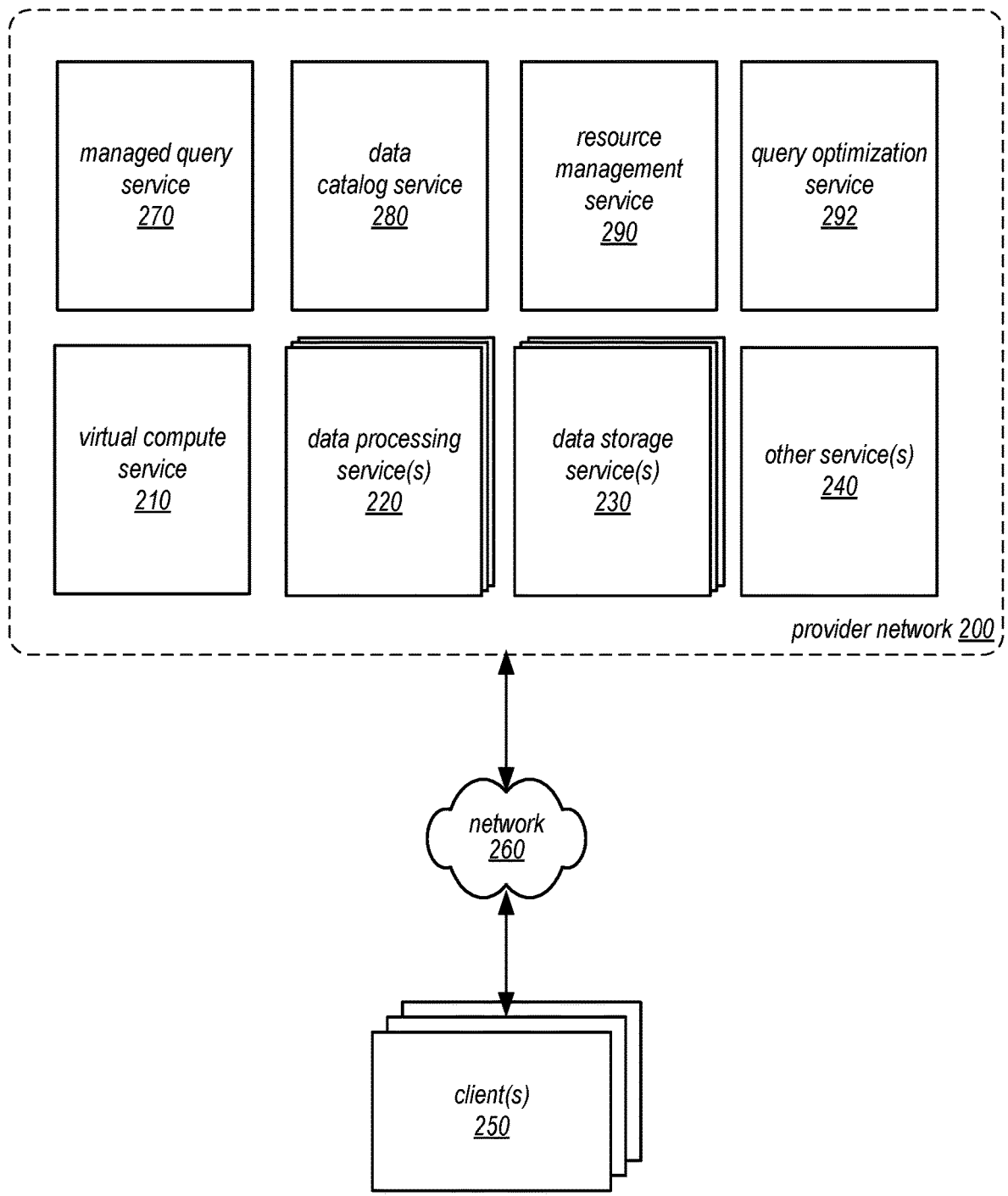
FIG. 2 is a logical block diagram illustrating a provider network offering a managed query service that obtains optimized query plans from query optimization service to execute queries, according to some embodiments.

FIG. 2 is a logical block diagram illustrating a provider network offering a managed query service that obtains optimized query plans from query optimization service to execute queries, according to some embodiments. Provider network 200 may be a private or closed system or may be set up by an entity such as a company or a public sector organization to provide one or more services (such as various types of cloud-based storage) accessible via the Internet and/or other networks to clients 250, in some embodiments. Provider network 200 may be implemented in a single location or may include numerous data centers hosting various resource pools, such as collections of physical and/or virtualized computer servers, storage devices, networking equipment and the like (e.g., FIGS. 15, 16 and computing system 2000 described below with regard to FIG. 17), needed to implement and distribute the infrastructure and storage services offered by the provider network 200. In some embodiments, provider network 200 may implement various computing resources or services, such as a virtual compute service 210, data processing service(s) 220, (e.g., relational or non-relational (NoSQL) database query engines, map reduce processing, data flow processing, and/ or other large scale data processing techniques), data storage service(s) 230, (e.g., an object storage service, block-based storage service, or data storage service that may store different types of data for centralized access) other services 240 (any other type of network based services (which may include various other types of storage, processing, analysis, communication, event handling, visualization, and security services not illustrated), managed query service 270, data catalog service 280, resource management service 290, and query optimization service 292.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 17 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual compute service 210 may be implemented by provider network 200, in some embodiments. Virtual computing service 210 may offer instances and according to various configurations for client(s) 250 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network 200 in different embodiments, including general purpose or special purpose computer servers, storage devices, network devices and the like. In some embodiments instance client(s) 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 250 applications, without for example requiring the client(s) 250 to access an instance. Applications (or other software operated/implemented by a compute instance and may be specified by client(s), such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length. Different configurations of compute instances, as discussed below with regard to FIG. 3, may be implemented as computing resources associated in different pools of resources managed by resource management service 290 for executing jobs routed to the resources, such as queries routed to select resources by managed query service 270.

Data processing services 220 may be various types of data processing services to perform different functions (e.g., query or other processing engines to perform functions such as anomaly detection, machine learning, data lookup, or any other type of data processing operation). For example, in at least some embodiments, data processing services 230 may include a map reduce service that creates clusters of processing nodes that implement map reduce functionality over data stored in one of data storage services 240. Various other distributed processing architectures and techniques may be implemented by data processing services 230 (e.g., grid computing, sharding, distributed hashing, etc.). Note that in some embodiments, data processing operations may be implemented as part of data storage service(s) 230 (e.g., query engines processing requests for specified data). Data processing service(s) 230 may be clients of data catalog service 220 in order to obtain structural information for performing various processing operations with respect to data sets stored in data storage service(s) 230, as provisioned resources in a pool for managed query service 270.

Data catalog service 280 may provide a catalog service that ingests, locates, and identifies data and the schema of data stored on behalf of clients in provider network 200 in data storage services 230. For example, a data set stored in a non-relational format may be identified along with a container or group in an object-based data store that stores the data set along with other data objects on behalf of a same customer or client of provider network 200. In at least some embodiments, data catalog service 280 may direct the transformation of data ingested in one data format into another data format. For example, data may be ingested into data storage service 230 as single file or semi-structured set of data (e.g., JavaScript Object Notation (JSON)). Data catalog service 280 may identify the data format, structure, or any other schema information of the single file or semi-structured set of data. In at least some embodiments, the data stored in another data format may be converted to a different data format as part of a background operation (e.g., to discover the data type, column types, names, delimiters of fields, and/or any other information to construct the table of semi-structured data in order to create a structured version of the data set). Data catalog service 280 may then make the schema information for data available to other services, computing devices, or resources, such as computing resources or clusters configured to process queries with respect to the data, as discussed below with regard to FIGS. 3-8. Data catalog service 280 may, in various embodiments collect, determine, maintain, obtain or otherwise store statistics on data sets, such as number of rows in a data object (e.g., table), number of storage units (e.g., blocks) for a data object, average size of data within the data object (e.g., row length), data distribution (e.g., histograms), data selectivity or density, and so on.

Data storage service(s) 230 may implement different types of data stores for storing, accessing, and managing data on behalf of clients 250 as a network-based service that enables clients 250 to operate a data storage system in a cloud or network computing environment. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 230 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 230 may be implemented as a centralized data store so that other data storage services may access data stored in the centralized data store for processing and or storing within the other data storage services, in some embodiments. A may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In at least some embodiments, one of data storage service(s) 230 may be a data warehouse service that utilizes a centralized data store implemented as part of another data storage service 230. A data warehouse service as may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Managed query service 270, as discussed below in more detail with regard to FIGS. 3-7, may manage the execution of queries on behalf of clients so that clients may perform queries over data stored in one or multiple locations (e.g., in different data storage services, such as an object store and a database service) without configuring the resources to execute the queries, in various embodiments. Resource management service 290, as discussed in more detail below, may manage and provide pools of computing resources for different services like managed query service 270 in order to execute jobs on behalf of the different services, as discussed above with regard to FIG. 1. Query optimization service 292, as discussed in more detail below with regard to FIG. 8, may provide optimized query plans to perform queries in response to requests for optimized query plans, in some embodiments. Queries may be received that are directed to one service (e.g., managed query service 270) or to data stored or accessed by multiple services (e.g., processing services 220 and/or data storage service(s) 230), in some embodiments.

Generally speaking, clients 250 may encompass any type of client configurable to submit network-based requests to provider network 200 via network 260, including requests for storage services (e.g., a request to create, read, write, obtain, or modify data in data storage service(s) 240, etc.) or managed query service 270 (e.g., a request to query data in a data set stored in one or more of data storage service(s) 230). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 240 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment.

Clients 250 may convey network-based services requests (e.g., queries or other access requests directed to data in data storage service(s) 230, operations, tasks, or jobs, being performed as part of data processing service(s) 230, or to interact with data catalog service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
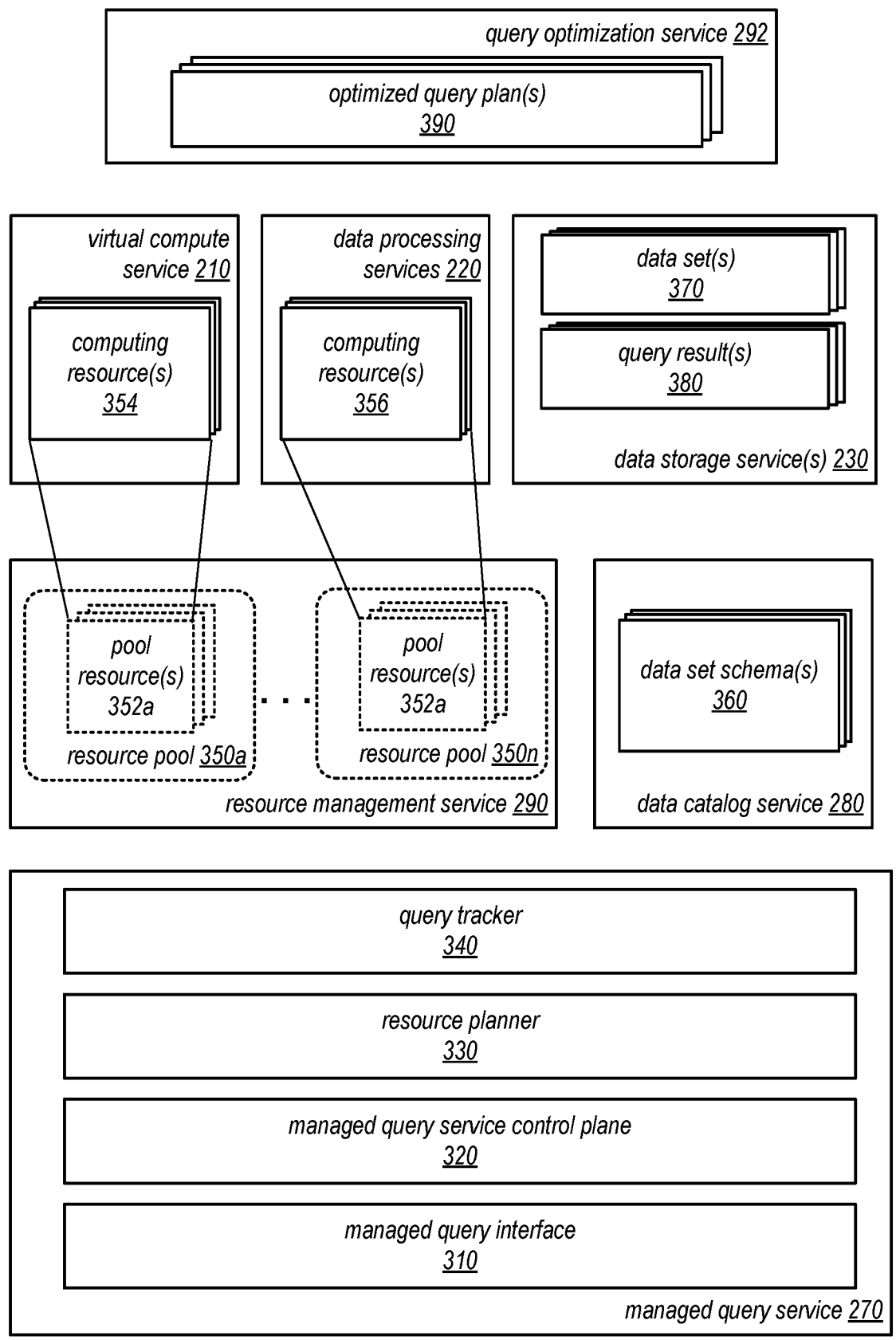
FIG. 3 is a logical block diagram illustrating a managed query service, according to some embodiments.

FIG. 3 is a logical block diagram illustrating a managed query service, according to some embodiments. As discussed below with regard to FIGS. 4-9, managed query service 270 may leverage the capabilities of various other services in provider network 200. For example, managed query service 270 may utilize resource management service 290 to provision and manage pools of preconfigured resources to execute queries, provide resources of preconfigured queries, and return utilized resources to availability. For example, resource management service 290 may instantiate, configure, and provide resource pool(s) 350a and 350n that include pool resource(s) 352a and 352n from one or more different resource services, such as computing resource(s) 354 in virtual compute service 210 and computing resource(s) 356 in data processing service(s) 220. Resource management service 290 may send requests to create, configure, tag (or otherwise associate) resources 352 for a particular resource pool, terminate, reboot, otherwise operate resources 352 in order to execute jobs on behalf of other network-based services.

Once a resource from a pool is provided (e.g., by receiving an identifier or other indicator of the resource to utilize), managed query service 270 may interact directly with the resource 354 in virtual compute service 210 or the resource 356 in data processing services 220 to execute queries, in various embodiments. Managed query service 270 may utilize data catalog service 280, in some embodiments to store data set schemas 352, as discussed below with regard to FIG. 4, for subsequent use when processing queries, as discussed below with regard to FIGS. 5-7, in some embodiments. For example, a data set schema may identify the field or column data types of a table as part of a table definition so that a query engine (executing on a computing resource), may be able to understand the data being queried, in some embodiments. Managed query service 270 may also interact with data storage service(s) 230 to directly source data sets 370 or retrieve query results 380, in some embodiments.

Managed query service 270 may implement a managed query interface 310 to handle requests from different client interfaces, as discussed below with regard to FIG. 4. For example, different types of requests, such as requests formatted according to an Application Programmer Interface (API), standard query protocol or connection, or requests received via a hosted graphical user interface implemented as part of managed query service may be handled by managed query interface 310.

Managed query service 270 may implement managed query service control plane 320 to manage the operation of service resources (e.g., request dispatchers for managed query interface 310, resource planner workers for resource planner 330, or query tracker monitors for query tracker 340). Managed query service control plane 320 may direct requests to appropriate components as discussed below with regard to FIGS. 5 and 6. For example, in at least some embodiments, managed query service control plane 320 may submit requests to obtain optimized query plans 390 from query optimization service 292 to perform queries received at managed query service 270. Managed query service 270 may implement authentication and authorization controls for handling requests received via managed query interface 310. For example, managed query service control plane 320 may validate the identity or authority of a client to access the data set identified in a query received from a client (e.g., by validating an access credential). In at least some embodiments, managed query service control plane 320 may maintain (in an internal data store or as part of a data set in an external data store, such as in one of data storage service(s) 230), query history, favorite queries, or query execution logs, and other managed query service historical data. Query execution costs may be billed, calculated or reported by managed query service control plane 320 to a billing service (not illustrated) or other system for reporting usage to users of managed query service, in some embodiments.

Figure 7:
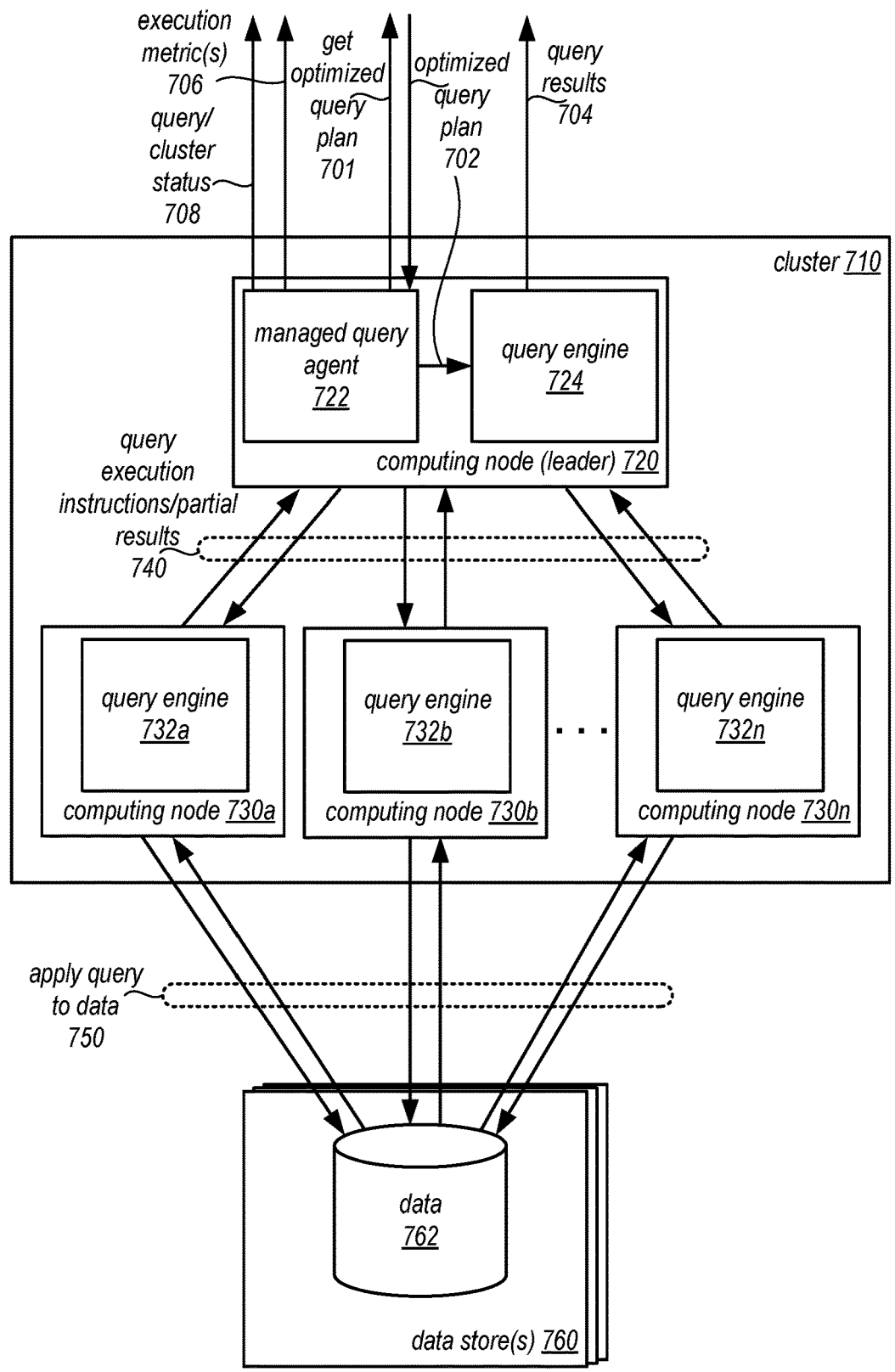
FIG. 7 is a logical block diagram illustrating a cluster processing a query as part of managed query execution, according to some embodiments.

Managed query service 270 may implement resource planner 330 to intelligently select available computing resources from pools for execution of queries, in some embodiments, as discussed in more detail below with regard to FIG. 7. For example, resource planner 330 may evaluated collected data statistics associated with query execution (e.g., reported by computing resources) and determine an estimated number or configuration of computing resources for executing a query within some set of parameters (e.g., cost, time, etc.). For example, machine learning techniques may be applied by resource planner 330 to generate a query estimation model that can be applied to the features of a received query to determine the number/configuration of resources, in one embodiment. Resource planner 330 may then provide or identify which ones of the resources available to execute the query from a pool that may best fit the estimated number/configuration, in one embodiment.

In various embodiments, managed query service 270 may implement query tracker 340 in order to manage the execution of queries at compute clusters, track the status of queries, and obtain the resources for the execution of queries from resource management service 290. For example, query tracker 340 may maintain a database or other set of tracking information based on updates received from different managed query service agents implemented on provisioned computing resources (e.g., computing clusters as discussed below with regard to FIGS. 5-6).

Figure 4:
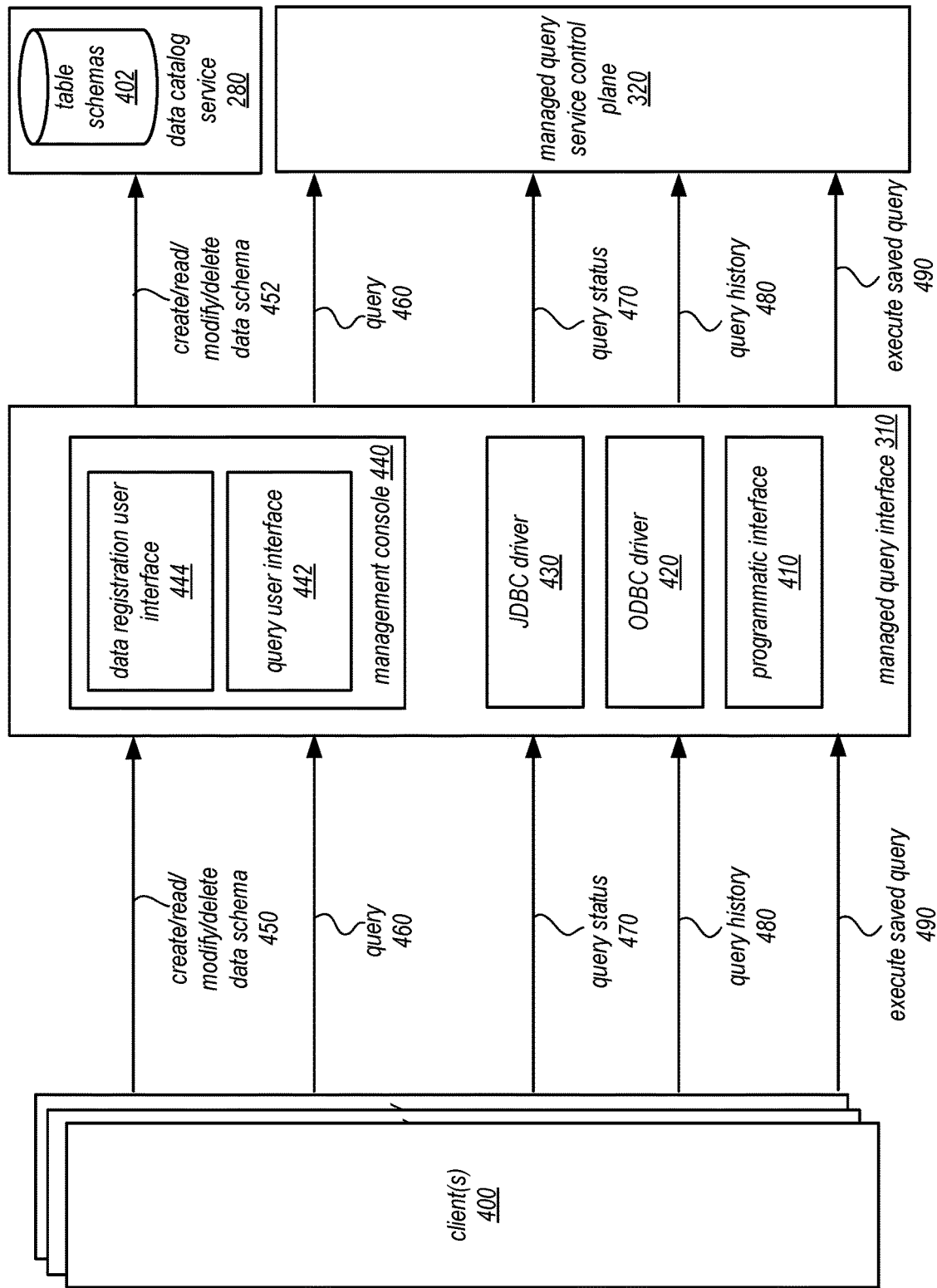
FIG. 4 is a diagram illustrating interactions between clients and managed query service, according to some embodiments.

FIG. 4 is a diagram illustrating interactions between clients and managed query service, according to some embodiments. Client(s) 400 may be client(s) 250 in FIG. 2 above or other clients (e.g., other services systems or components implemented as part of provider network 200 or as part of an external service, system, or component, such as data exploration or visualization tools (e.g., Tableau, Looker, MicroStrategy, Qliktech, or Spotfire). Clients 400 can send various requests to managed query service 270 via managed query interface 310. Managed query interface 310 may offer a management console 440, which may provider a user interface to submit queries 442 (e.g., graphical or command line user interfaces) or register data schemas 444 for executing queries. For example, management console 440 may be implemented as part of a network-based site (e.g., an Internet website for provider network 200) that provides various graphical user interface elements (e.g., text editing windows, drop-down menus, buttons, wizards or workflows) to submit queries or register data schemas. Managed query interface 310 may implement programmatic interfaces 410 (e.g., various Application Programming Interface (API) commands) to perform queries, and various other illustrated requests. In some embodiments, managed query interface 310 may implement custom drivers that support standard communication protocols for querying data, such as JDBC driver 430 or ODBC driver 420.

Clients 400 can submit many different types of request to managed query interface 310. For example, in one embodiment, clients 400 can submit requests 450 to create, read, modify, or delete data schemas. For example, a new table schema can be submitted via a request 450. Request 450 may include a name of the data set (e.g., table), a location of the data set (e.g. an object identifier in an object storage service, such as data storage service 230, file path, uniform resource locator, or other location indicator), number of columns, column names, data types for fields or columns (e.g., string, integer, Boolean, timestamp, array, map, custom data types, or compound data types), data format (e.g., formats including, but not limited to, JSON, CSV, AVRO, ORC, PARQUET, tab delimited, comma separated, as well as custom or standard serializers/desrializers), partitions of a data set (e.g., according to time, geographic location, or other dimensions), or any other schema information for process queries with respect to data sets, in various embodiments. In at least some embodiments, request to create/read/modify/delete data set schemas may be performed using a data definition language (DDL), such as Hive Query Language (HQL). Managed query interface 310 may perform respective API calls or other requests 452 with respect to data catalog service 280, to store the schema for the data set (e.g., as part of table schemas 402). Table schemas 402 may be stored in different formats (e.g., Apache Hive). Note, in other embodiments, managed query service 270 may implement its own metadata store.

Clients 400 may also send queries 460 and query status 470 requests to managed query interface 310 which may direct those requests 460 and 470 to managed query service control plane 320, in various embodiments, as discussed below with regard to FIGS. 5 and 6. Queries 460 may be formatted according to various types of query languages, such as Structured Query Language (SQL) or HQL.

Client(s) 400 may also submit requests for query history 480 or other account related query information (e.g., favorite or common queries) which managed query. In some embodiments, client(s) 400 may programmatically trigger the performance of past queries by sending a request to execute a saved query 490, which managed query service control plane 320 may look-up and execute. For example, execute saved query request may include a pointer or other identifier to a query stored or saved for a particular user account or client. Managed query service control plane 320 may then access that user query store to retrieve and execute the query (according to techniques discussed below with regard to FIGS. 5-6). In some embodiments, an optimized query plan for the saved query may be retrieved from query optimization service 292 and performed without the generation of a new optimized query plan for the saved query, in some embodiments.

Figure 5:
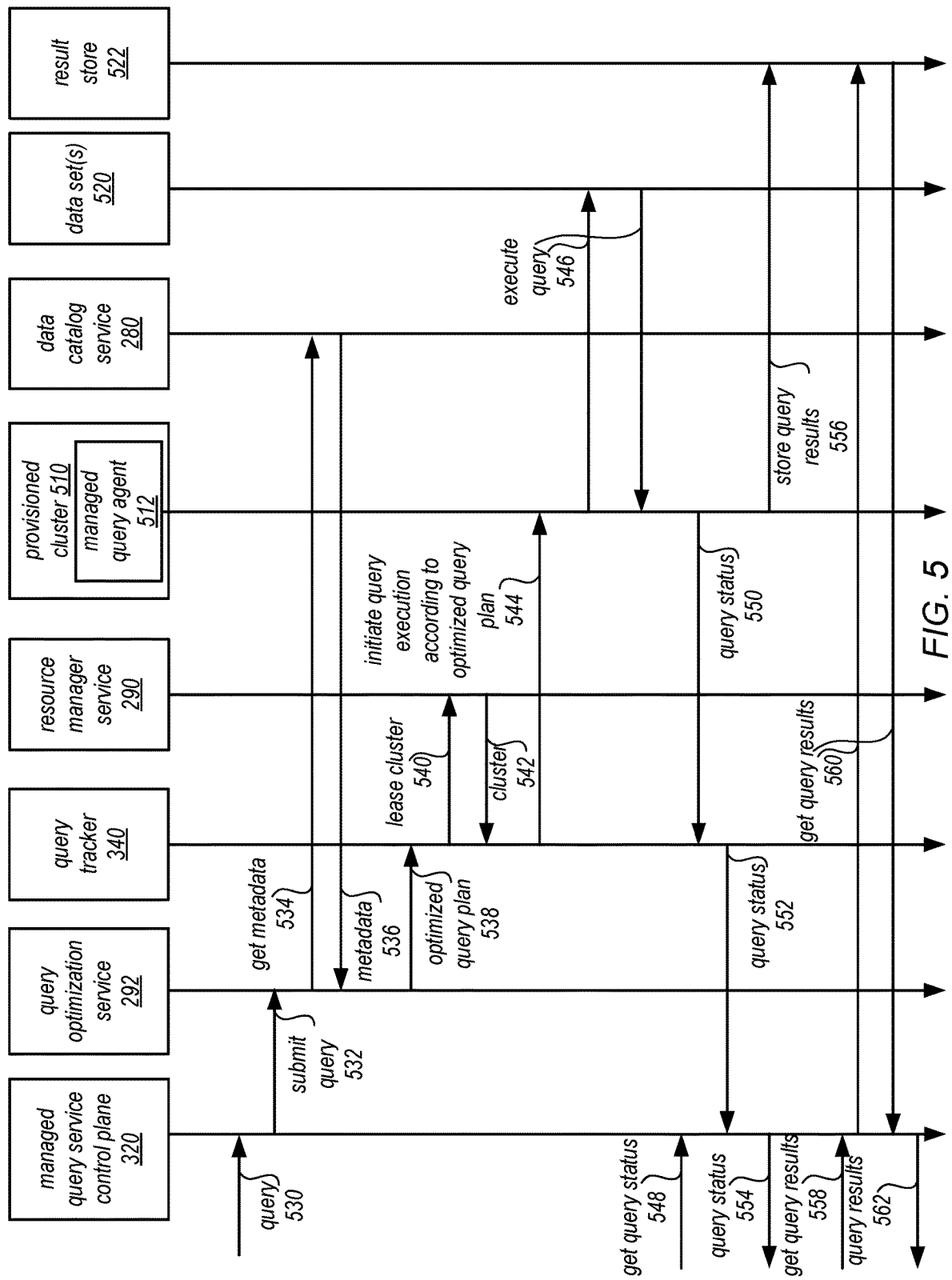
FIG. 5 is a sequence diagram for managed execution of queries utilizing synchronous processing for a query optimization service, according to some embodiments.

FIG. 5 is a sequence diagram for managed execution of queries utilizing a resource planner, according to some embodiments. Query 530 may be received at managed query service control plane 320 which may submit the query 532 to query optimization service 292. Query optimization service 292 may generate an optimized query plant to process the query based on metadata requested 534 and received 536 from data catalog service 280. Query optimization service 292 may determine an optimized query and translate the optimized query into an engine-specific format for the engine implemented at provisioned cluster 510. Query optimization service 292 may then submit the query optimization plan 538 to query tracker 340. Query tracker 340 may obtain a lease 540 on a cluster 542 from resource manager service and then initiate initiate execution of the query 544 according to the optimized query plan at the provisioned cluster 510, sending a query execution instruction to a managed query agent 512.

Managed query agent 512 may direct or initiate execution of the query 546 with respect to data set(s) 520 according to the optimized query plan. Managed query agent 512 may send query status 550 to query tracker 340 which may report query status 552 in response to get query status 548 request, sending a response 554 indicating the query status. Provisioned cluster 510 may store the query results 556 in a result store 522 (which may be a data storage service 230). Managed query service control plane 320 may receive a request to get query results 558 and get query results 560 from results store 522 and provide the query results 562 in response, in some embodiments.

Figure 6:
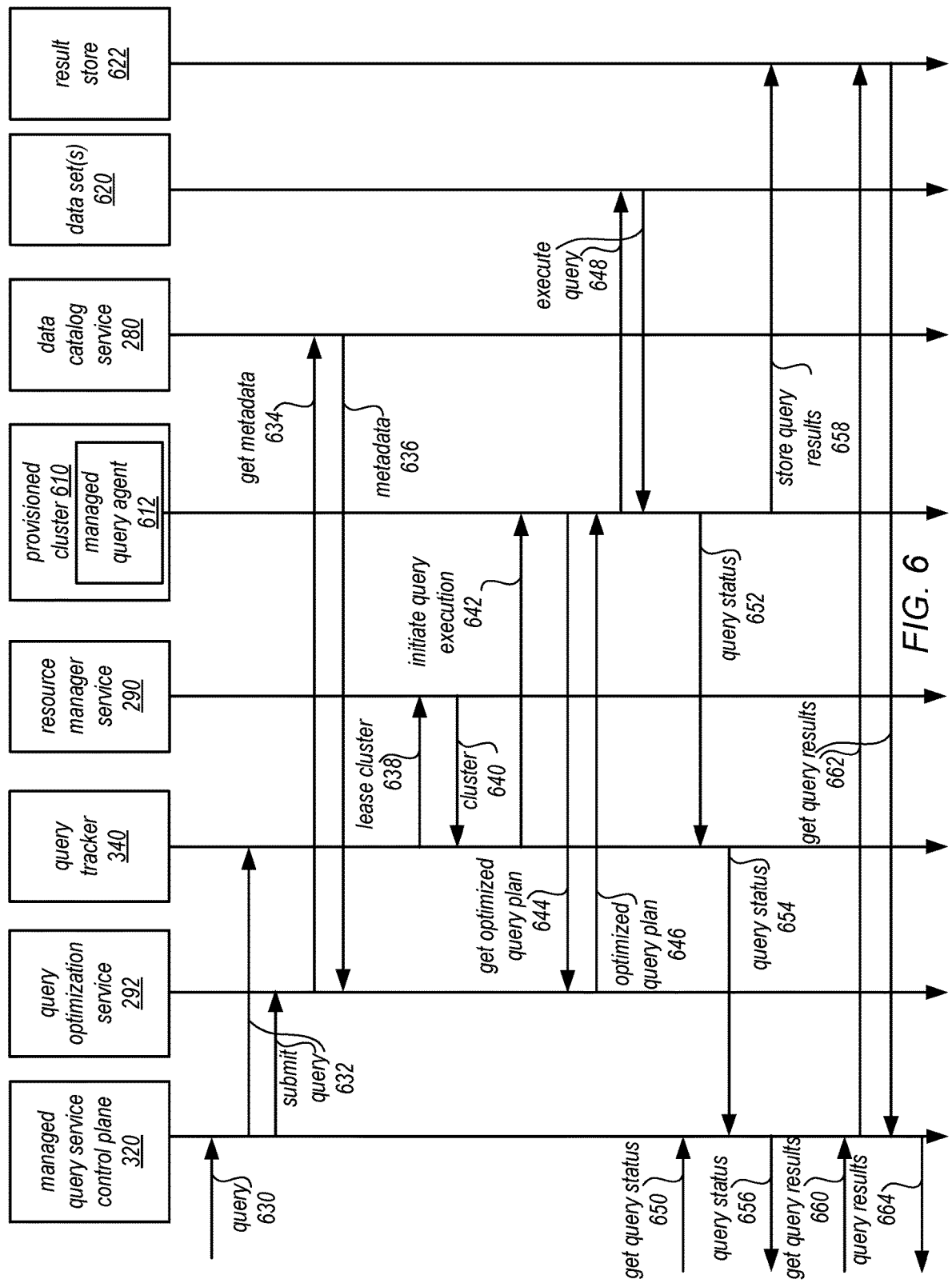
FIG. 6 is a sequence diagram for managed execution of queries utilizing asynchronous processing for a query optimization service, according to some embodiments.

FIG. 6 is a sequence diagram for managed execution of queries utilizing asynchronous processing for a query optimization service, according to some embodiments. Query 630 may be received at managed query service control plane 320 which may submit the query 632 to query optimization service 292 and query tracker 340. Query tracker 340 may proceed with dispatching the request and obtain a lease 638 on a cluster 640 from resource manager service and then initiate execution of the query 642 according to the optimized query plan at the provisioned cluster 610, sending a query execution instruction to a managed query agent 612.

While query tracker 340 is obtaining a cluster and dispatching the query, query optimization service 292 may generate an optimized query plant to process the query based on metadata requested 634 and received 636 from data catalog service 280. Query optimization service 292 may determine an optimized query and translate the optimized query into an engine-specific format for the engine implemented at provisioned cluster 610. Query optimization service 292 may then store or otherwise maintain the optimized query plan until receiving a request to get the optimized query plan 644 from managed query agent 612. Query optimization service 292 may then provide the optimized query plan 646 to managed query agent 612.

Managed query agent 612 may direct or initiate execution of the query 648 with respect to data set(s) 620 according to the optimized query plan. Managed query agent 612 may send query status 652 to query tracker 340 which may report query status 654 in response to get query status 650 request, sending a response 656 indicating the query status. Provisioned cluster 610 may store the query results 658 in a result store 622 (which may be a data storage service 230). Managed query service control plane 320 may receive a request to get query results 660 and get query results 662 from results store 622 and provide the query results 664 in response, in some embodiments.

Different types of computing resources may be provisioned and configured in resource pools, in some embodiments. Single-node clusters or multi-node compute clusters may be one example of a type of computing resource provisioned and configured in resource pools by resource management service 290 to service queries for managed query service 270. FIG. 7 is a logical block diagram illustrating a cluster processing a query as part of managed query execution, according to some embodiments. Cluster 710 may implement a computing node 720 that is a leader node (according to the query engine 724 implemented by cluster 710). In some embodiments, no single node may be a leader node, or the leader node may rotate from processing one query to the next. Managed query agent 722 may be implemented as part of leader node 720 in order to provide an interface between the provisioned resource, cluster 710, and other components of managed query service 270, resource management service 290, and query optimization service 292. For example, managed query agent 722 may provide further data to managed query service 270, such as the status 708 of the query (e.g. executing, performing I/O, performing aggregation, etc.) and execution metrics 706 (e.g., health metrics, resource utilization metrics, cost metrics, length of time, etc.). In some embodiments, managed query agent 722 may provide cluster/query status 708 and execution metric(s) 706 to resource management service 290 (in order to make pool management decisions, such as modification events, lease requests, etc.). For example, managed query agent 722 may indicate cluster status 708 to resource management service 290 indicating that a query has completed and that the cluster 710 is ready for reassignment (or other resource lifecycle operations). In some embodiments, managed query agent 722 may provide execution metric(s) 706 to query optimization service in order to update cost modeling.

In some embodiments, managed query agent 722 may send requests to query optimization service 292 to get an optimized query plan 701 (or stages of an optimized query plan previously received, as discussed below with regard to FIG. 13). In some embodiments, managed query agent 722 may receive optimized query plan 702 from query optimization service 292 (or stages thereof), or receive optimized query plan 702 from query tracker 340.

Leader node 720 may implement query engine 724 to execute queries according to optimized query plans 701. For instance, managed query agent 722 may implement a programmatic interface for query tracker to submit queries optimization plans (as discussed above in FIGS. 5 and 6), and then send the optimized query plan 702 to query engine 724. Query engine 724 may execute the optimized query plan 702. For example, leader node 722 may send query execution instructions 740 to computing nodes that access and apply the query to data 762 in data store(s) 760 according to the plan. Compute nodes, such as nodes 730a, 730b, and 730n, may respectively implement query engines 732a, 732b, and 732n to execute the query instructions, apply the query to the data 750, and return partial results 740 to leader node 720, which in turn may generate and send query results 704. Query engine 724 and query engines 732 may implement various kinds of distributed query or data processing frameworks, such as the open source Presto distributed query framework or the Apache Spark framework.

Figure 8:
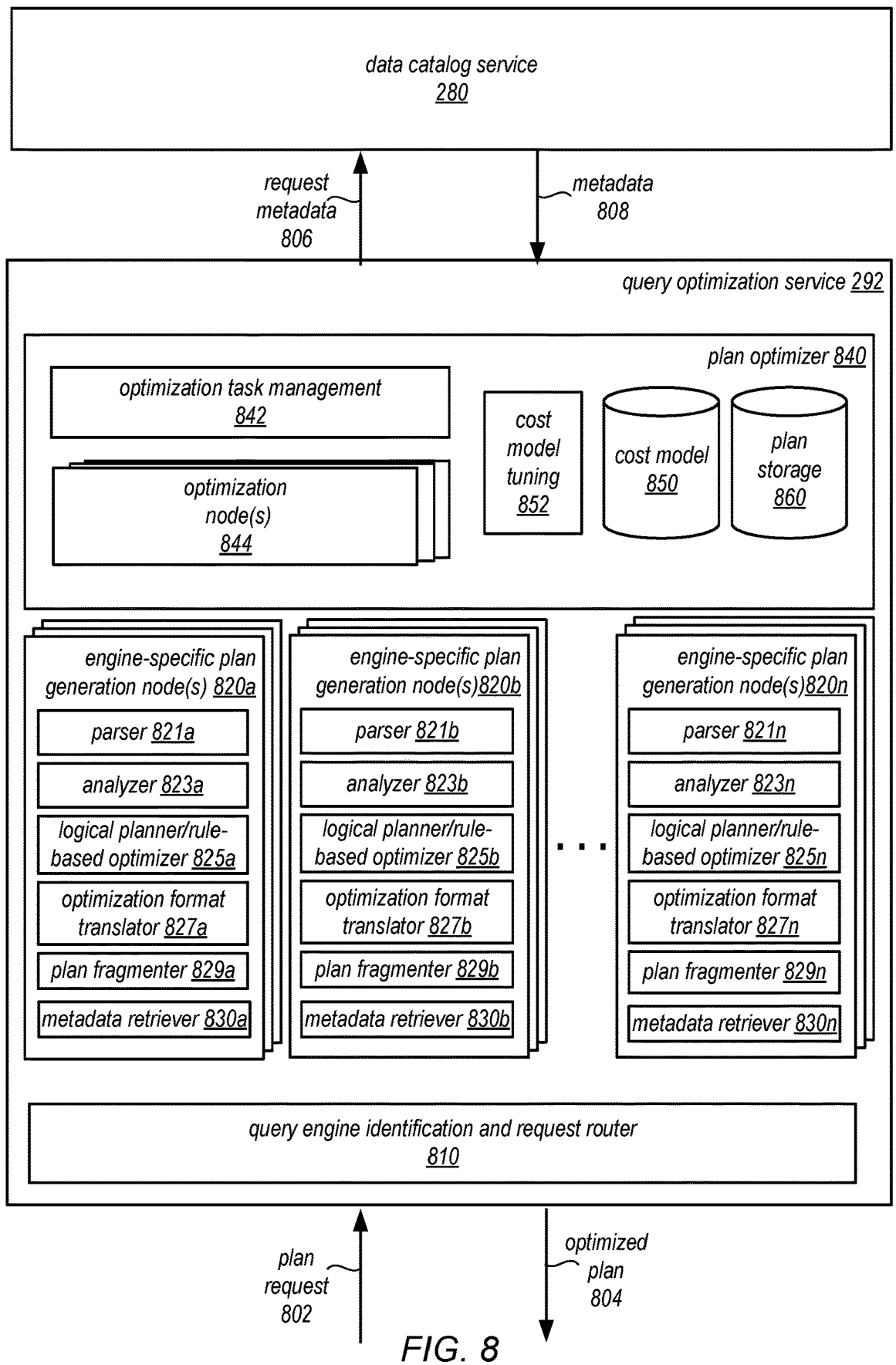
FIG. 8 is a logical block diagram illustrating a query optimization service, according to some embodiments.

FIG. 8 is a logical block diagram illustrating a query optimization service, according to some embodiments. Query optimization service 292 may receive plan requests 802 and return optimized plans 804 in response to different clients (e.g., managed query service control plane 320 in FIG. 5, management agents like management agent 722 in FIG. 7, or other clients (e.g., other services that desire optimized query plans, such as other data processing services 220 in FIG. 2). In at least some embodiments, query optimization service 292 may implement a network-based interface, which may be a programmatic interface (e.g., API), in some embodiments. For example, plan request 802, and optimized plan 804 may be received and sent according to API requests and responses.

Query engine identification and request router 810 may interpret plan requests 802 received via the network interface, identify the type of query engine for the request, and route the request to one of the engine-specific plan generation node(s) 820, in various embodiments. For example, query engine identification and request router 810 may select the type of query engine to generate an initial plan to perform the query according to default query processing engines (e.g., mapped to different types of query statements) or an analysis of the query that considers the storage locations of the data set or the language, protocol, or format of the query (e.g., such as a SQL request or API request specific to a type of query engine or data processing service). The request 802 may specify the engine selection, in some embodiments, or the user account of provider network 200 associated with the submitter of plan request 802 may be mapped to a default type of query engine, in various embodiments.

In some embodiments, plan request 802 may be indicative of a request for a plan to perform query processing across multiple query engine types or services in response to a single query. For example, query engine identification and request router may identify the different query engine types (e.g., according to techniques similar to those discussed above) in order to dispatch sub-query plan generation requests to different engine-specific plan generation node(s) 820.

Query optimization service 292 may implement engine-specific plan generation nodes 820 (or clusters of nodes) for different types of processing or other query engines, in some embodiments. For example, engine-specific plan generation nodes 820a may map to a type of data processing service (e.g., managed query service 270), engine-specific plan generation nodes 820b may map to a type of database engine (e.g., relational or non-relational), and engine-specific plan generation nodes 820n may map to a particular configuration of a database engine (e.g., a number of nodes in a single processing cluster). Thus engine-specific plan generation nodes 820 can be implemented for a variety of different types of query engines, in some embodiments.

Engine-specific plan generation nodes 820 may implement respective features to handle the generation of initial plans for a query, obtain relevant metadata for query optimization, and submit optimization tasks to plan optimizer 840. For example, engine-specific plan generation nodes 820 may implement respective parsers, 821a, 821b, and 821n to generate parse trees or other parsed formats of the query particular to the different types of query engine, analyzers, 823a, 823b, and 823n, to perform validations, such as those discussed below with regard to FIG. 12, and other preparation operations for initial plan generation, logical planners/rule-based optimizers, 825a, 825b, and 825n, to perform operation identification and rearrangements of the plan according to engine specific rules that optimize query performance, and optimization format translators, 827a, 827b, and 827n, which may translate the initial plans for each engine-specific format to a plan optimization format that can be processed by plan optimizer 840. Engine-specific plan generation nodes 820 may, in some embodiments, implement metadata retrievers, 830a, 830b, and 830n, to request 806 and receive relevant metadata 806 from data catalog service (e.g., data cardinality, histograms, and other statistics, schema information, etc.) or from other metadata sources (e.g., other data storage services or locations for data sets identified in a query).

Requests to generate optimized plans may be sent to plan optimization 840. Optimization task management 842 may be implemented to dispatch, direct, or otherwise assign optimization tasks to different optimization nodes. Optimization nodes 844 may work in single or distributed fashion to perform various optimization techniques, including cost-based optimization according cost model 850, multi-object optimization, and other optimization techniques, in some embodiments. For example, optimization may be selected for optimization performance at individual query engines performing a sub-query of the query or may optimize the overall performance of all query engines performing different sub-queries—which may result in individual query engines performing query plans that have less performant individual query processing operations if the work can be redistributed amongst query engines to achieve an overall shorter processing time, in some embodiments. Requests for additional metadata may be generated and sent by optimization nodes 844 to engine-specific generation node(s) 820 which obtain the metadata from data catalog 280 or other locations as requested, in some embodiments. Optimization nodes 844 may store some plans in plan storage 860 for further analysis or to provide optimized plans for repeat queries (or similar queries) without further optimization analysis.

In some embodiments, engine-specific plan generation node(s) 820 may implement plan fragmenters, 829a, 829b, and 829n to divide or stage optimized plans, grouping operations in different stages for execution. As discussed below with regard to FIG. 13, modifications to the optimization of individual stages may be requested from query optimization service 292, which may utilize plan fragmenters 829 to determine alternative stages for optimized query plans, in some embodiments.

In at least some embodiments, plan optimizer 840 may implement cost model tuning 852 to collect performance metrics corresponding to the actual costs of executed optimized query plans to determine updates to cost model 850, as discussed below with regard to FIG. 14.

Figure 9:
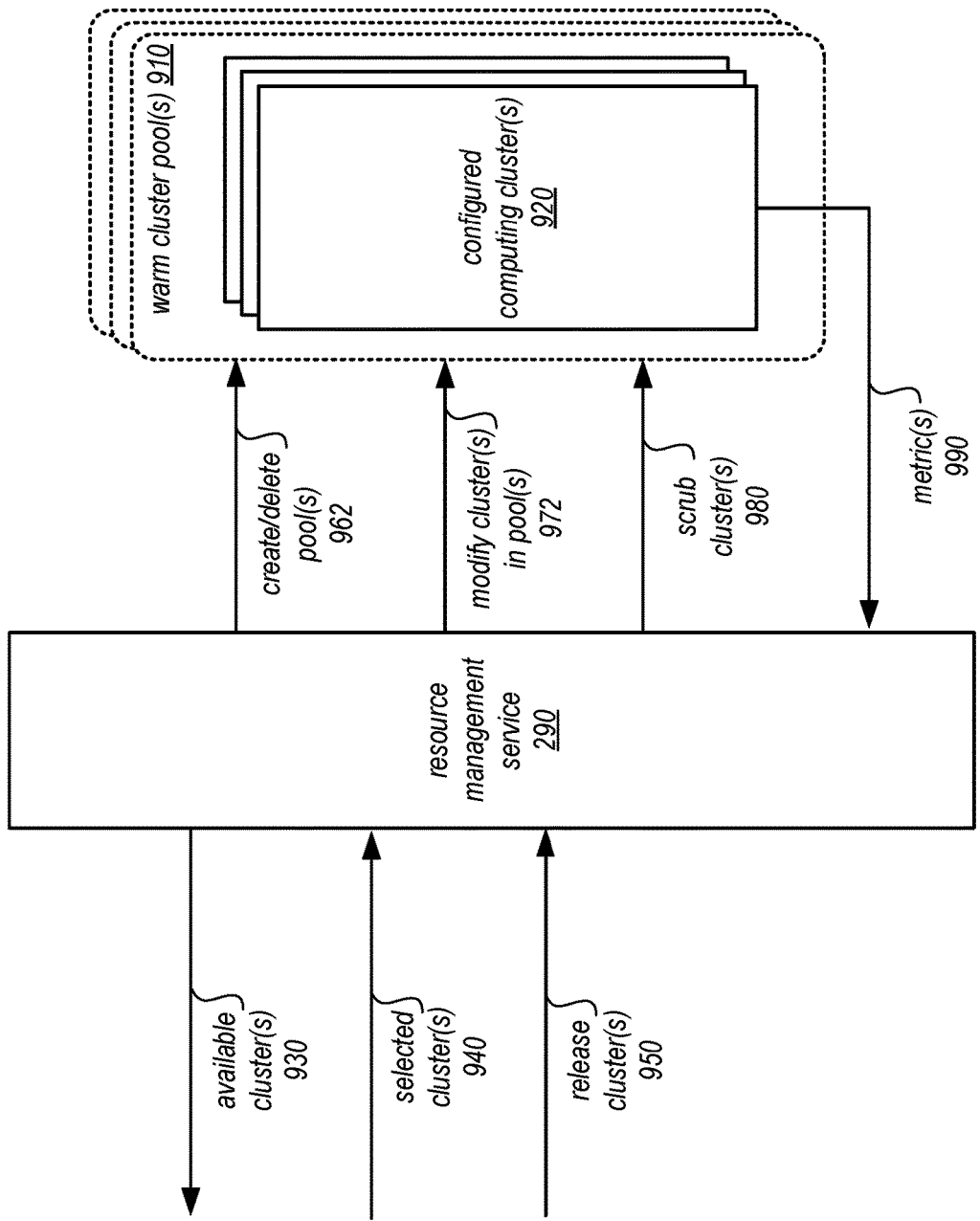
FIG. 9 is logical block diagram illustrating interactions between a resource management service and pools of resources, according to some embodiments.

FIG. 9 is logical block diagram illustrating interactions between a resource management service and pools of resources, according to some embodiments. Resource management service 290 may implement a programmatic interface (e.g., API) or other interface that allows other network-based services (or a client or a provider network) to submit requests for preconfigured resources from a resource pool managed by resource management service 290. For example, a request for available clusters 930 may be received (e.g., from resource planner 330) in order to provide a snapshot or other state of configured computing clusters 920 in warm cluster pools 910. Query tracker may send an indication that identifies the selected cluster 940 (e.g., by specifying a location, identifier, or other information for the identified computing resource) so that resource manager service 290 may remove the resource from the pool of available resource. For example, resource management service 290 may update state information for the cluster to indicate that the cluster is leased or otherwise unavailable. Resource management service 290 may also receive requests to release a cluster 950 from a current assignment (e.g., as the query execution at the cluster is complete). Resource management service 290 may then update state information (e.g., the lease) for the cluster and pool to return the cluster to the pool, in some embodiments.

As indicated at 962, resource management service 290 may automatically (or in response to requests (not illustrated)), commission or decommission pool(s) of clusters 910. For example in some embodiments, resource management service 290 may perform techniques that select the number and size of computing clusters 920 for the warm cluster pool 910. The number and size of the computing clusters 920 in the warm cluster pool 910 can be determined based upon a variety of factors including, but not limited to, historical and/or expected volumes of query requests, the price of the computing resources utilized to implement the computing clusters 920, and/or other factors or considerations, in some embodiments.

Once the number and size of computing clusters 920 has been determined, the computing clusters 920 may be instantiated, such as through the use of an on-demand computing service, or virtual compute service or data processing service as discussed above in FIG. 2. The instantiated computing clusters 920 can then be configured to process queries prior to receiving the queries at the managed query service. For example, and without limitation, one or more distributed query frameworks or other query processing engines can be installed on the computing nodes in each of the computing clusters 920. As discussed above, in one particular implementation, the distributed query framework may be the open source PRESTO distributed query framework. Other distributed query frameworks can be utilized in other configurations. Additionally, distributed processing frameworks or other query engines can also be installed on the host computers in each computing cluster 920. As discussed above, the distributed processing frameworks can be utilized in a similar fashion to the distributed query frameworks. For instance, in one particular configuration, the APACHE SPARK distributed processing framework can also, or alternately, be installed on the host computers in the computing clusters 920.

Instantiated and configured computing clusters 920 that are available for use by the managed query service 270 are added to the warm cluster pool 910, in some embodiments. A determination can be made as to whether the number or size of the computing clusters 920 in the warm cluster pool needs is to be adjusted, in various embodiments. The performance of the computing clusters 920 in the warm cluster pool 910 can be monitored based on metric(s) 990 received from the cluster pool. The number of computing clusters 920 assigned to the warm cluster pool 910 and the size of each computing cluster 920 (i.e. the number of host computers in each computing cluster 920) in the warm cluster pool 910 can then be adjusted. Such techniques can be repeatedly performed in order to continually optimize the number and size of the computing clusters 920 in the warm cluster pool 910. Configurations of clusters for a resource pool or a new pool may be provided as provisioning recommendations (as discussed above with regard to FIG. 7), which may indicate the configuration of a cluster (e.g. query engine type, query engine configuration settings, As indicated at 980, in some embodiments, resource management service 270 may scrub clusters(s) 980, (e.g., as a result of the lease state transitioning to expired or terminated) by causing the cluster to perform operations (e.g., a reboot, disk wipe, memory purge/dump, etc.) so that the cluster no longer retains client data and is ready to process another query. For example, resource management service 290 may determine whether a computing cluster 920 is inactive (e.g. the computing cluster 920 has not received a query in a predetermined amount of time). If resource management service 290 determines that the computing cluster 920 is inactive, then the computing cluster 920 may be disassociated from the submitter of the query. The computing cluster 920 may then be "scrubbed," such as by removing data associated with the submitter of the queries from memory (e.g. main memory or a cache) or mass storage device (e.g. disk or solid state storage device) utilized by the host computers in the computing cluster 920. The computing cluster 920 may then be returned to the warm cluster pool 910 for use in processing other queries. In some embodiments, some clusters that are inactive might not be disassociated from certain users in certain scenarios. In these scenarios, the user may have a dedicated warm pool of clusters 910 available for their use.

As indicated at 970, resource management service may receive a request to configure or specify a pool modification event for a pool, in some embodiments. For example, the pool modification event may be defined according to one or more criteria, such as the minimum number of idle resources, maximum number of idle resources, average job execution time thresholds, pool or resource lifecycle/state conditions, or any other set of one or more criteria that may be evaluated to detect a pool modification event.

Figure 10:
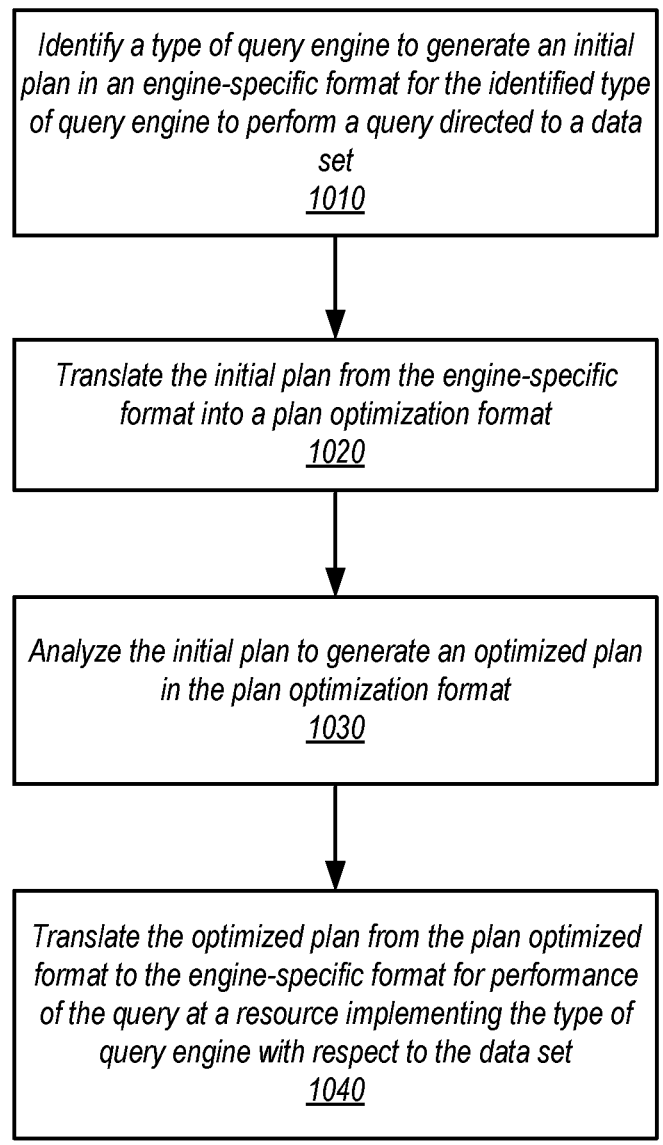
FIG. 10 is a high-level flowchart illustrating various methods and techniques to implement query optimization independent of query engine types, according to some embodiments.

Although FIGS. 2-9 have been described and illustrated in the context of a provider network leveraging multiple different services to perform queries using a query optimization service, the various components illustrated and described in FIGS. 2-8 may be easily applied to other systems, or devices that optimize the performance of query plans at different types of query engines. As such, FIGS. 2-9 are not intended to be limiting as to other embodiments of a system that may implement a query optimization service or other query optimization system from the query engines or other processing platforms performing queries. FIG. 10 is a high-level flowchart illustrating various methods and techniques to implement query optimization independent of query engine types, according to some embodiments. Various different systems and devices may implement the various methods and techniques described below, either singly or working together. For example, a query optimization service as described above with regard to FIGS. 2-9 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 1010, a type of query engine to generate an initial plan in an engine-specific format may be identified for a query directed to a data set, in various embodiments. For example, a request to generate an optimized query plan for a query may be received that indicates the type of query engine to perform the query, in one embodiment. In some embodiments, a source (e.g., network address), user name or account, or other information associated with a query may indicate the type of query engine to perform the request. An evaluation of the query may be performed, in some embodiments, to select one out of a group of query engines, based on the query (e.g., by analyzing the storage locations of data, the language, protocol, or format of the query, such as a SQL request or API request specific to a type of query engine or data processing service (e.g., NoSQL database, data warehouse, map-reduce processing framework, etc.).

As indicated at 1020, the initial plan generated for the engine-specific format may be translated into a plan optimization format, in various embodiments. For example, mapping information may be maintained for each type of engine-specific format, which describes what operators correspond to plan optimization format operators. In some embodiments, the translation of the initial plan may include restructuring, re-ordering, or otherwise modifying the representation of the engine-specific format into a format that can be analyzed for query optimization independent of the type of query engine upon which the plan is to be performed (e.g., converting the initial plan from one data structure, such as a tree, to another data structure, such as a graph).

As indicated at 1030, the initial plan may be analyzed to generate an optimized plan in the plan optimization format. For example, metadata including data statistics, such as data cardinality for columns in a table, may be accessed to determine least costly access paths or ordering for operations in the initial query plan. Different costs may be assigned or determined for different operations, and thus alternative orderings or operations may be compared to select the least costly plan in terms of time to execute. In some embodiments, multi-objective query planning may be performed to allow for the optimization of multiple features, in addition to time costs. For example, the time cost of alternative plans may be evaluated as one feature along with other features such as the cost to utilize the resources (e.g., provider network utilization costs charged to may be one feature, resource utilization costs (e.g., I/O, processor utilization, network bandwidth, etc.), distribution of costs in distributed processing resources (e.g., is each processing resource evenly utilized), etc. In at least some embodiments, user indications or preferences (e.g., based on query hints, Service-Level Agreement selections, indications of the query is a repeatedly performed query, such as a saved query) may be used to identify features for optimization. As discussed above, and below, cost modeling and data statistic collection can be used to refine optimization choices over time. Query optimization may also consider the collective performance of multiple query optimization plans for different sub-queries (e.g., a in a scenario where the query is a sub-query of another query) in order to select the combination of query optimization plans that provides optimal query performance.

As indicated at 1040, the optimized plan may be translated from the optimized format to the engine-specific format for performance of the query at a resource implementing the type of query engine with respect to the data set, in various embodiments. For example, the operation mappings, reorderings, and other information that associate plan optimization format operations and structures with engine-specific format operations and structures may be evaluated to transform the optimized plan into a format that is processable by the type of query engine identified at 1010 above.

A query may be, in some embodiments, a sub-query of another query directed to multiple data sets (e.g., stored in different data stores), in some embodiments. Similar techniques to those discussed above can be performed for multiple sub-queries of the same query directed to different data sets. For example, an optimization plan can be generated for a sub-query directed to a data set stored in a relational database and another optimization plan can be generated for a sub-query directed to a data set stored in a non-relational database. Therefore, various combinations or iterations of the features discussed above can be performed to develop composite optimization plans out of individual optimized query plans for sub-queries, in at least some embodiments.

Figure 11:
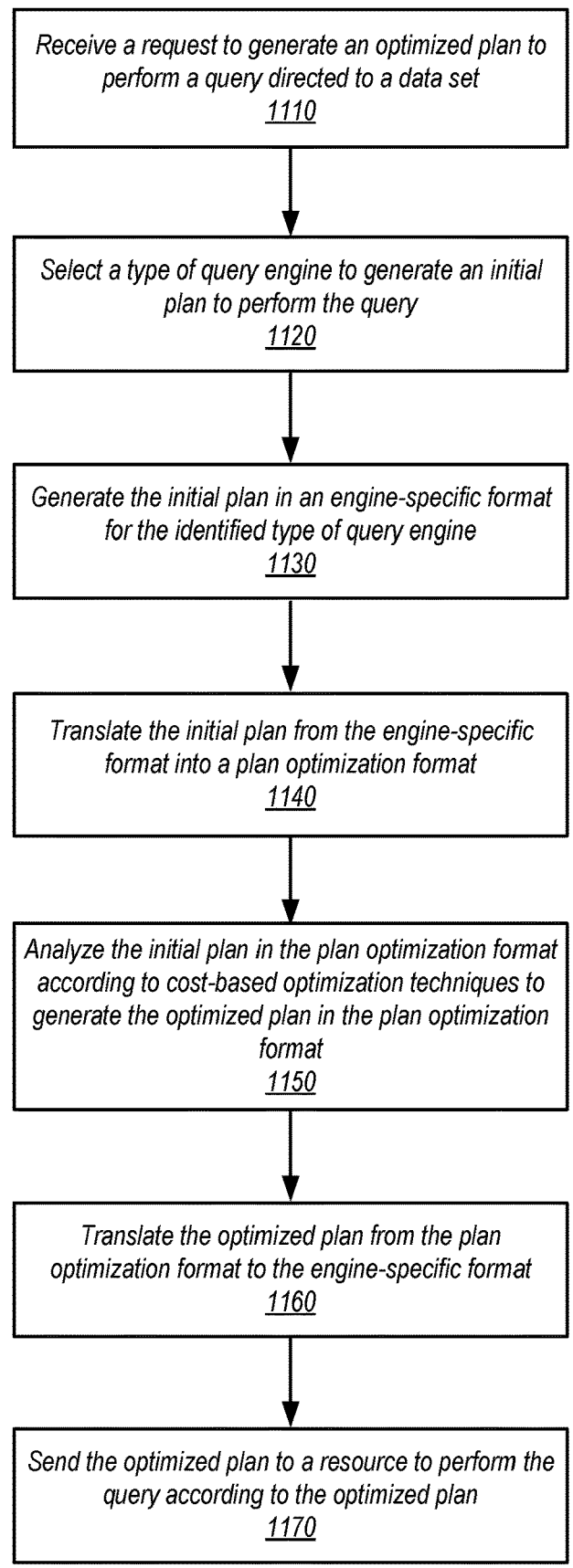
FIG. 11 is a high-level flowchart illustrating various methods and techniques to process query optimization requests, according to some embodiments.

As discussed above with regard to FIGS. 2-9, query optimization independent of query engine types may be implemented as part of a service or other system that responds to requests for optimized query plans. FIG. 11 is a high-level flowchart illustrating various methods and techniques to process query optimization requests, according to some embodiments. As indicated at 1110, a request to generate an optimized plan to perform a query directed to a data set may be received, in various embodiments. For example, a programmatic interface (e.g., an API) may be implemented that provides a client (e.g., a database engine or other service) with the ability to specify a query, engine type, target for the query optimization plan (e.g., if different than the requestor), optimization hints, criteria, or other information that may influence or alter the optimization analysis of the query, in some embodiments.

As indicated at 1120, a type of query engine to generate an initial plan to perform the query may be selected. For example, default query processing engines may be mapped to different types of query statements (e.g., SQL mapped to a cluster processing framework, such as Presto, NoSQL mapped to MongoDB). In some embodiments, an analysis of the query may consider the storage locations of data or the language, protocol, or format of the query, such as a SQL request or API request specific to a type of query engine or data processing service. The request may specify the engine to be selected (or multiple engines if the query is directed to multiple data sets, as discussed above), in some embodiments, or the user account, client, or other source information may be mapped to or default to a particular type of query engine, in various embodiments.

As indicated at 1130, the initial plan may be generated in an engine-specific format for the identified type of query engine, in some embodiments. For example, engine-specific planning nodes, pipelines, or other components may implement the initial planning features for processing queries directed to those types of query engines. In one instance, a query bound for one type of processing cluster may be parsed, analyzed for validity (e.g., as discussed below with regard to FIG. 12), evaluated according to logical, rules-based optimization that identifies and arranges the performance of query performance operations (e.g., join push downs, scans, filters, aggregation, etc.) to determine a tree of logical operations to be performed as the initial query plan.

As indicated at 1140, the initial plan generated for the engine-specific format may be translated into a plan optimization format, in various embodiments. As discussed above with regard to FIG. 10, mapping information may be maintained for each type of engine-specific format, which describes what operators correspond to plan optimization format operators. In some embodiments, the translation of the initial plan may include restructuring, re-ordering, or otherwise modifying the representation of the engine-specific format into a format that can be analyzed for query optimization independent of the type of query engine upon which the plan is to be performed.

As indicated at 1150, the initial plan may be analyzed to generate an optimized plan in the plan optimization format. As discussed above with regard to FIG. 10, metadata including data statistics, such as data cardinality for columns in a table, may be accessed to determine least costly access paths or ordering for operations in the initial query plan. Different costs may be assigned or determined for different operations, and thus alternative orderings or operations may be compared to select the least costly plan in terms of time to execute. In some embodiments, multi-objective query planning may be performed to allow for the optimization of multiple features, in addition to time costs. For example, the time cost of alternative plans may be evaluated as one feature along with other features such as the cost to utilize the resources (e.g., provider network utilization costs charged to may be one feature, resource utilization costs (e.g., I/O, processor utilization, network bandwidth, etc.), distribution of costs in distributed processing resources (e.g., is each processing resource evenly utilized), etc. In at least some embodiments, user indications or preferences (e.g., based on query hints, Service-Level Agreement selections, indications of the query is a repeatedly performed query, such as a saved query) may be used to identify features for optimization. As discussed above, and below, cost modeling and data statistic collection can be used to refine optimization choices over time. Query optimization may also consider the collective performance of multiple query optimization plans for different sub-queries (e.g., a in a scenario where the query is a sub-query of another query) in order to select the combination of query optimization plans that provides optimal query performance.

As indicated at 1160, the optimized plan may be translated from the optimized format to the engine-specific format for performance of the query at a resource implementing the type of query engine with respect to the data set, in various embodiments. As discussed above, the operation mappings, reorderings, and other information that associate plan optimization format operations and structures with engine-specific format operations and structures may be evaluated to transform the optimized plan into a format that is processable by the type of query engine identified at 1120 above.

As indicated at 1170, the optimized plan may be sent to a resource to perform the query according to the optimized plan, in some embodiments. For example, a request to initiate or being processing at selected or identified computing resource(s) may be performed, in some embodiments, according to an API request or the first query may be initiated by transmitting the query optimization plan to the computing resources for execution. As discussed above with regard to FIG. 6, in at least some embodiments, the query optimization plan may be provided to the resource in response to receiving a request from the resource to obtain the query optimization plan (even if the resource did not request the generation of the query optimization plan). In some embodiments, query optimization plans may be stored and later provided in response to other plan optimization requests with a similar or same query instead of performing the techniques described above with regard to elements 1120 to 1160. In some embodiments, stored query optimization plans may be retrieved for further analysis (e.g., during times when optimization analysis resources have spare capacity to perform additional optimization analysis) and updated.

Figure 12:
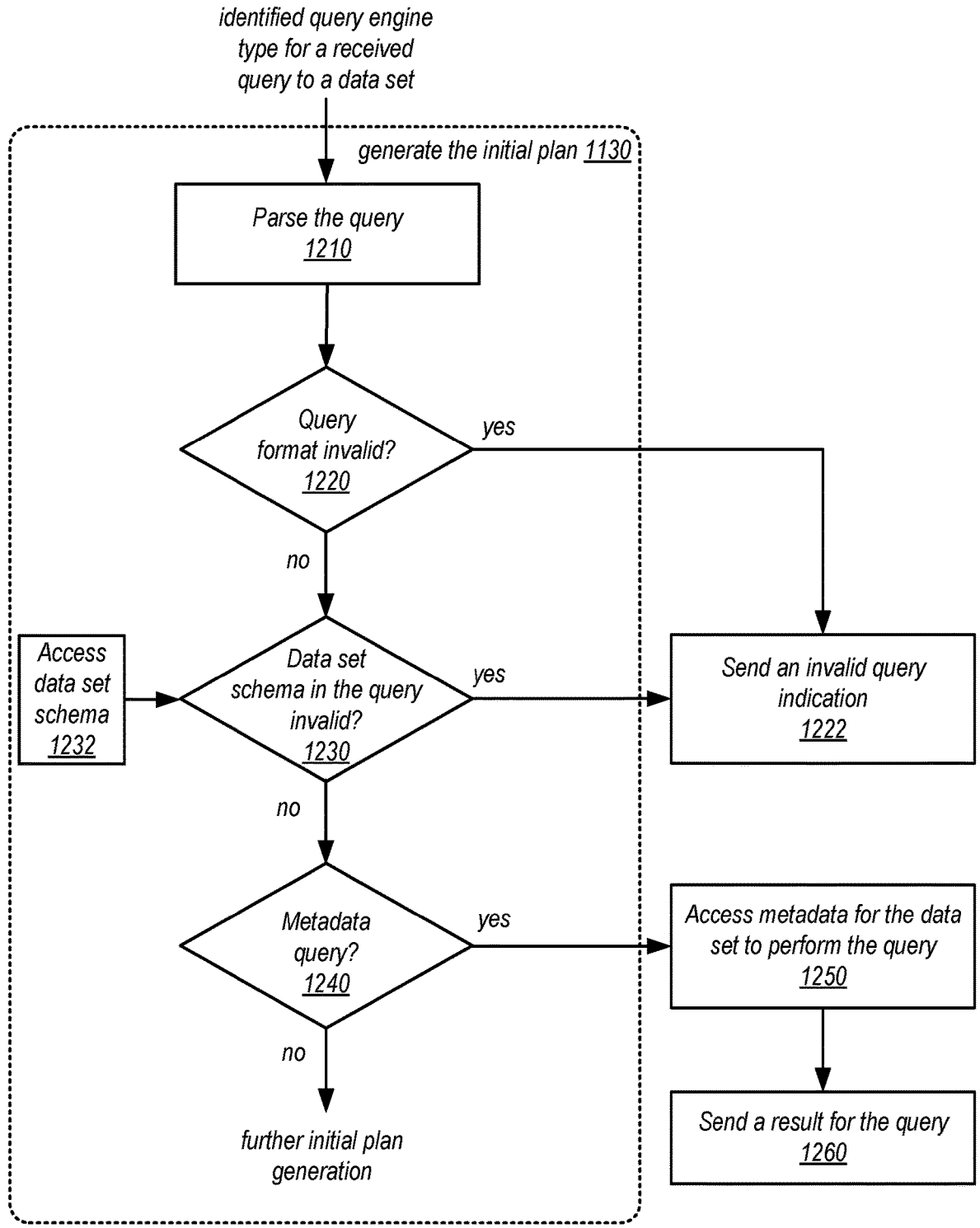
FIG. 12 is a high-level flowchart illustrating various methods and techniques to validate a query as part of generating an initial plan to perform a query, according to some embodiments.

FIG. 12 is a high-level flowchart illustrating various methods and techniques to validate a query as part of generating an initial plan to perform a query, according to some embodiments. As discussed above in FIGS. 10 and 11, an initial query plan may be generated (e.g., at 1130 in FIG. 11) before optimization is performed, in some embodiments. As illustrated in FIG. 12, the identified query engine type may determine the format in which the query is generated. For example, as indicated at 1210, the query may be parsed, in one embodiment. The parsed results of the query (e.g., a parse tree or other data structure) may be evaluated or otherwise analyzed (e.g., as discussed above with regard to analyzer 823 in FIG. 8. If, for example, there is an error in query syntax (e.g., SQL errors, such as misspelled key words, wrong command arrangements, incorrect field specifications). As indicated at 1220, if the parsed query statement is invalid (e.g., because of a SQL error), then as indicated at 1220, an invalid query indication may be sent, halting further processing of the query, in some embodiments.

As indicated at 1230, in some embodiments, whether the data schema specified in the query is valid may be evaluated, by accessing data set schema information, as indicated at 1232. For example, if a column name, field, name, or other schema information for a database table is misspelled, incorrect, or missing, then a comparison with metadata for the table may indicate that the data set schema in the query is invalid. If, invalid, as indicated by the positive exit from 1230, then an invalid query indication may be sent, as indicated at 1222, halting further processing of the query, in some embodiments.

As indicated at 1240, in some embodiments, an evaluation of the parsed query may be performed to determine what type of query has been received. For example, if the query includes a SQL SELECT statement, API call to get, retrieve, or obtain data, etc., then the type of the query may be directed to data of the data set. If, however, the query is directed toward data about or describing the data, such as DESCRIBE table request, which may return the column name, type, null value allowed setting, whether the value is a key value, etc., which can be answered by accessing the metadata, instead of generating a query plan, then as indicated by the positive exit from 1240, metadata for the data set may be accessed to perform the query, as indicated at 1250, a result based on the metadata may be sent as a result for the query, as indicated at 1260, halting generation of the initial query plan, in some embodiments.

Figure 13:
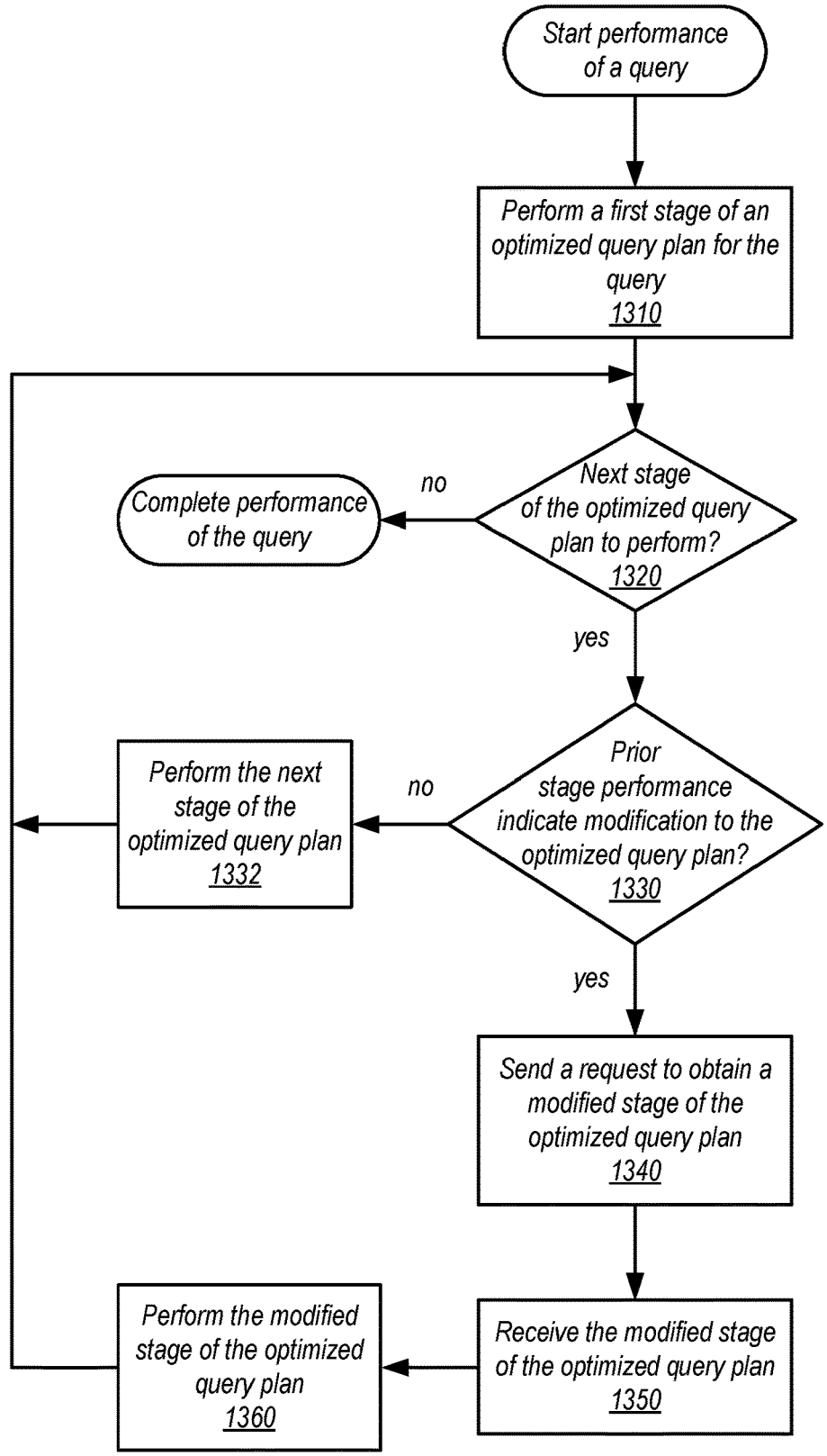
FIG. 13 is a high-level flowchart illustrating various methods and techniques to perform adaptive query optimization using independent query optimization, according to some embodiments.

FIG. 13 is a high-level flowchart illustrating various methods and techniques to perform adaptive query optimization using independent query optimization, according to some embodiments. Performance of a query may be started (e.g., at a processing cluster as discussed above with regard to FIGS. 5-7, according to an optimized query plan generated by an independent query optimizer (as discussed above with regard to FIGS. 10 and 11). An optimized query plan may be divided into multiple stages, in various embodiments. For example, each stage may include on or more operations as part of the query plan (e.g., read/scan operations, write operations, expression evaluation or other function operations, filter operations, sort operations, aggregate operations, limit operations, join operations, etc.), in one embodiment.

As indicated at 1310, a first stage of the optimized query plan for the query may be performed, some embodiments. If more than one stage of the optimized query plan is performed, as indicated by the positive exit from 1320, then a determination may be made as to whether prior stage performance indicate if a modification to the optimized query plan should be made, as indicated at 1330, in some embodiments. For example, performance metrics, statistics for the data, or other information obtained as a result of performing the stage of the query plan may be evaluated to determine whether a next stage of the query plan should proceed as planned, or should be reevaluated by comparing a cost, time, or other assumption/estimate/modeled value based on the query plan and with the actual cost, time, or other value determined as a result of performing the stage of the query plan. If, for instance, the difference in values does not exceed a threshold (e.g., 10%, X units, etc.), then it may be determined that the next stage (or multiple subsequent stages of the plan should not be modified, as indicated by the negative exit from 1330, in some embodiments. Then the next stage of the optimized query plan may be performed without modification as indicated at 1332.

Alternatively, as indicated by the positive exit from 1330, in some embodiments, modification to the next stage of the query plan may be determined. If, for instance, the difference in values exceeds a threshold (e.g., 10%, X units, etc.), then it may be determined that the next stage (or multiple subsequent stages of the plan should be reevaluated, in one embodiment. As indicated at 1340, a request may be sent to obtain a modified stage (or stages of the optimized query plane, in various embodiments. The request may include the performance data or other information used to determine that a modification was desired for the next stage (e.g., in order to provide information to determine the modification (or whether a modification to the next stage should be made). As discussed above, the request may be sent according to a programmatic interface which may include various fields, or other formats, for indicating the stage of the plan to re-optimize as well as the performance data or other information upon which the modification determination was initially made). In some embodiments, the query plan itself may specify the modification determination thresholds or performance information to be collected. In at least one embodiments, the query execution plan may automatically identify a next stage for modification and indicate the desired information to send in the query plan modification request (e.g., data statistics, performance information, etc.), not illustrated in FIG. 13.

The query engine may perform similar techniques to those discussed below based on the indicated stage, the provided in formation, and, in some embodiment, the original query statement (e.g., from which alternative stages or plans may be derived). Once the stage (or stages) are optimized otherwise modified, they may be received, as indicated at 1350, and performed, as indicated at 1360. The adaptive modification determination may be performed iteratively for each stage in the optimized query plan, as depicted in FIG. 13, or may be performed once (or at specified stages identified in the optimized query plan).

Figure 14:
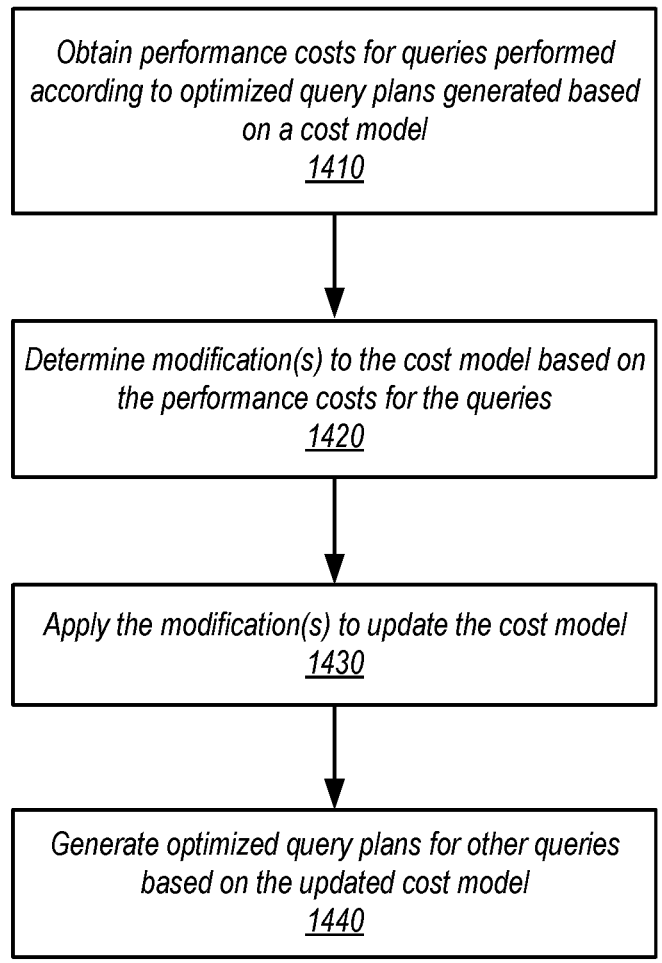
FIG. 14 is a high-level flowchart illustrating various methods and techniques to update an optimization cost model according to query performance based on query performance, according to some embodiments.

FIG. 14 is a high-level flowchart illustrating various methods and techniques to update an optimization cost model according to query performance based on query performance, according to some embodiments. As indicated at 1410, performance costs for queries performed according to optimized query plans generated based on a cost model may be obtained, in some embodiments. For example, as discussed above with regard to FIG. 7, a cluster or other processing resource that performs a query may collect, store, transmit or otherwise report performance metrics, including metrics which identify the time, processor utilization, network bandwidth, I/O, or other resources consumed to perform different operations in an optimized plan (e.g., join type A for query X took Y time with Z percent processor utilization). In some embodiments, these metrics may be reported to other system components, data stores, or services, such as the managed query service (e.g., query tracker 340 discussed above in FIGS. 3, 5, and 6), data catalog service 280 (discussed above in FIGS. 2, 5, 6, and 8), or other metrics or performance collection. In other embodiments, a sweeping or polling technique may be employed to request performance metrics from computing resources upon completion of a query.

In some embodiments, modifications to the cost model based on the performance costs may be determined for the queries, as indicated at 1420. For example, the performance time or cost of I/O operations as a percentage of the modeled total time or modeled cost of performing a query plan operation may be adjusted up or down depending upon the actual time or cost of different queries. In some embodiments, further costs or features may be added to the cost model (e.g., costs associated with reading data from remote instead of attached storage), or other logic that is used to implement query plan operations. As indicated at 1430, the modification(s) may be applied to update the cost model. For example, an external data store (e.g., as discussed above in FIG. 8) may be updated to include the changed or updated cost values), or a library or other data structure that includes the cost model (e.g., for the independent query optimization techniques discussed above in FIGS. 10 and 11) may be recompiled, reassembled, or otherwise modified to include the modifications to the cost model, in some embodiments.

Once the cost model has been updated, then subsequent query plans may be generated by a query optimizer based on the updated cost model, as indicated 1440, in some embodiments. In this way, the cost model may be adapted to reflect changing performance costs of queries (e.g., due to changes in hardware, changes in processing software, or storage access technologies, etc.).

The methods described herein may in various embodiments be implemented by any combination of hardware and software. For example, in one embodiment, the methods may be implemented by a computer system (e.g., a computer system as in FIG. 17) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 15:
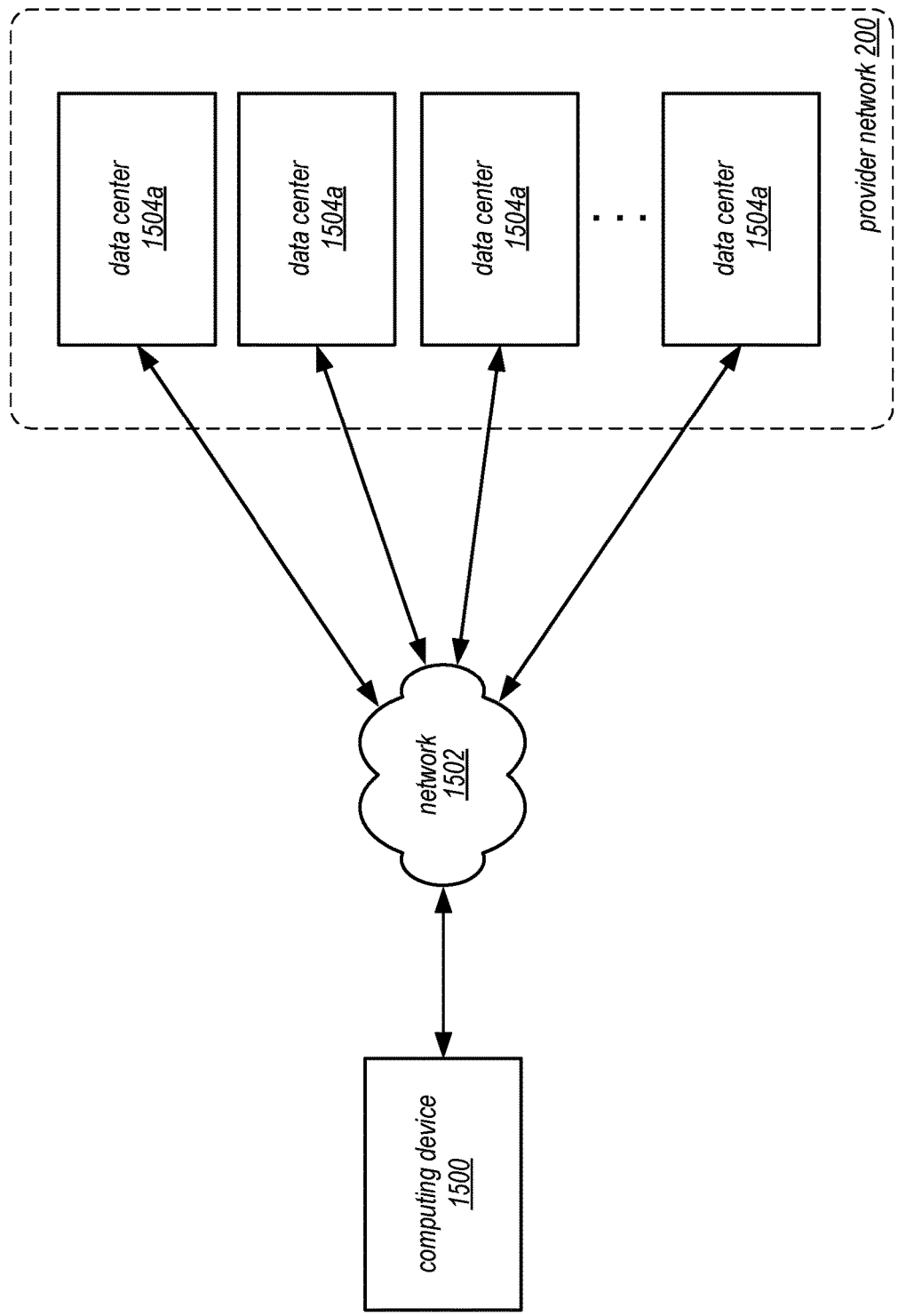
FIG. 15 is a logical block diagram that shows an illustrative operating environment that includes a service provider network that can be configured to implement aspects of the functionality described herein, according to some embodiments.

FIG. 15 is a logical block diagram that shows an illustrative operating environment that includes a service provider network that can implement aspects of the functionality described herein, according to some embodiments. As discussed above, the service provider network 200 can provide computing resources, like VM instances and storage, on a permanent or an as-needed basis. Among other types of functionality, the computing resources provided by the service provider network 200 can be utilized to implement the various services described above. As also discussed above, the computing resources provided by the service provider network 200 can include various types of computing resources, such as data processing resources like VM instances, data storage resources, networking resources, data communication resources, network services, and the like.

Each type of computing resource provided by the service provider network 200 can be general-purpose or can be available in a number of specific configurations. For example, data processing resources can be available as physical computers or VM instances in a number of different configurations. The VM instances can execute applications, including web servers, application servers, media servers, database servers, some or all of the services described above, and/or other types of programs. The VM instances can also be configured into computing clusters in the manner described above. Data storage resources can include file storage devices, block storage devices, and the like. The service provider network 200 can also provide other types of computing resources not mentioned specifically herein.

The computing resources provided by the service provider network maybe implemented, in some embodiments, by one or more data centers 1504A-1304N (which might be referred to herein singularly as "a data center 1504" or in the plural as "the data centers 1504"). The data centers 1504 are facilities utilized to house and operate computer systems and associated components. The data centers 1504 typically include redundant and backup power, communications, cooling, and security systems. The data centers 1504 can also be located in geographically disparate locations. One illustrative configuration for a data center 1504 that can be utilized to implement the technologies disclosed herein will be described below with regard to FIG. 16.

The customers and other users of the service provider network 200 can access the computing resources provided by the service provider network 200 over a network 1502, which can be a wide area communication network ("WAN"), such as the Internet, an intranet or an Internet service provider ("ISP") network or a combination of such networks. For example, and without limitation, a computing device 1500 operated by a customer or other user of the service provider network 200 can be utilized to access the service provider network 200 by way of the network 1502. It should be appreciated that a local-area network ("LAN"), the Internet, or any other networking topology known in the art that connects the data centers 1504 to remote customers and other users can be utilized. It should also be appreciated that combinations of such networks can also be utilized.

Figure 16:
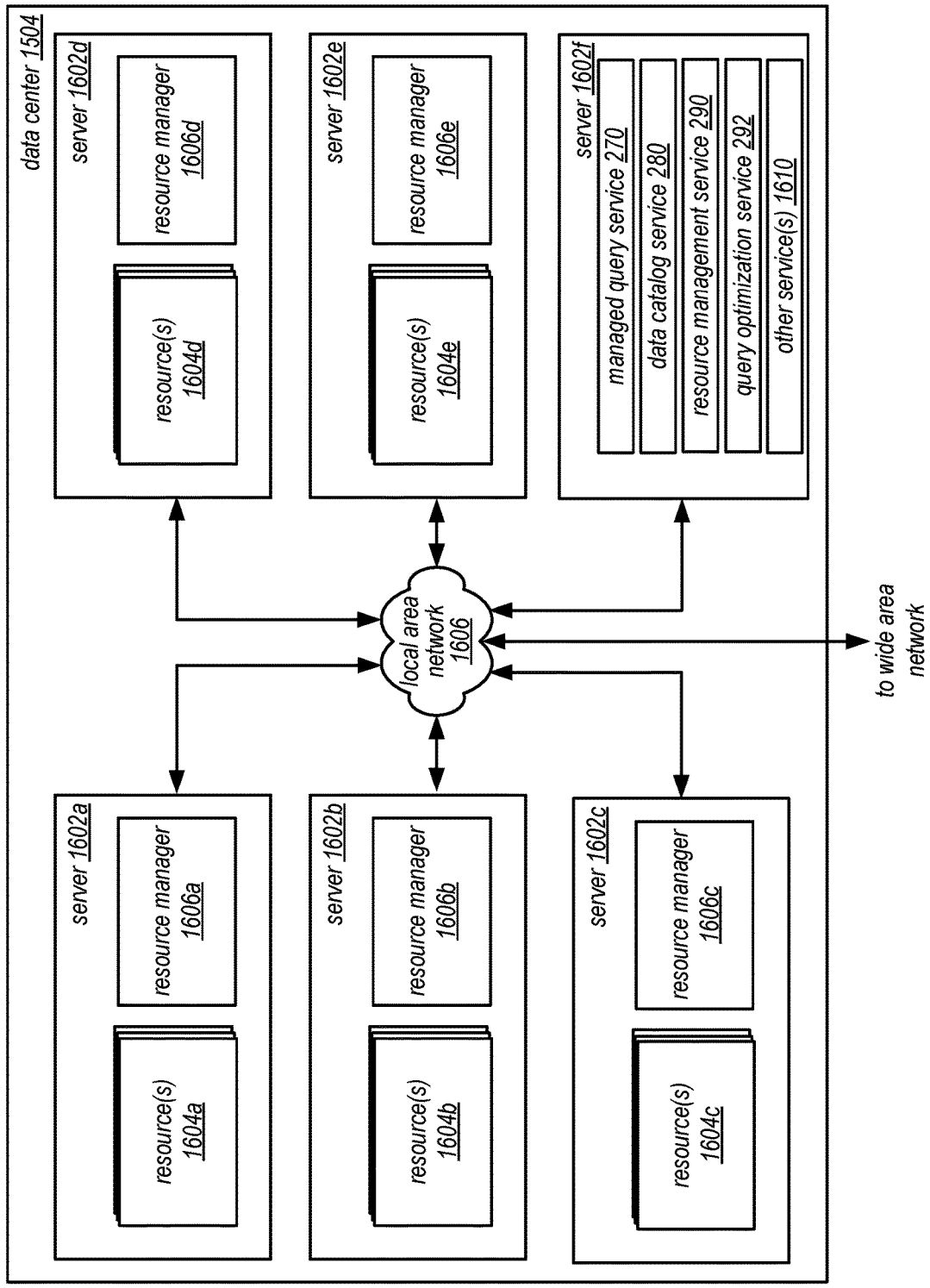
FIG. 16 is a logical block diagram illustrating a configuration for a data center that can be utilized to implement aspects of the technologies disclosed herein, according to some embodiments.

FIG. 16 is a logical block diagram illustrating a configuration for a data center that can be utilized to implement aspects of the technologies disclosed herein, according to various embodiments. is a computing system diagram that illustrates one configuration for a data center 1504 that implements aspects of the technologies disclosed herein for providing managed query execution, such as managed query execution service 270, in some embodiments. The example data center 1504 shown in FIG. 16 includes several server computers 1602A-1402F (which might be referred to herein singularly as "a server computer 1602" or in the plural as "the server computers 1602") for providing computing resources 1604A-1404E.

The server computers 1602 can be standard tower, rack-mount, or blade server computers configured appropriately for providing the computing resources described herein (illustrated in FIG. 16 as the computing resources 1604A-1404E). As mentioned above, the computing resources provided by the provider network 200 can be data processing resources such as VM instances or hardware computing systems, computing clusters, data storage resources, database resources, networking resources, and others. Some of the servers 1602 can also execute a resource manager 1606 capable of instantiating and/or managing the computing resources. In the case of VM instances, for example, the resource manager 1606 can be a hypervisor or another type of program may enable the execution of multiple VM instances on a single server computer 1602. Server computers 1602 in the data center 1504 can also provide network services and other types of services, some of which are described in detail above with regard to FIG. 2.

The data center 1504 shown in FIG. 16 also includes a server computer 1602F that can execute some or all of the software components described above. For example, and without limitation, the server computer 1602F can execute various components for providing different services of a provider network 200, such as the managed query service 270, the data catalog service 280, resource management service 290, and other services 1610 (e.g., discussed above) and/or the other software components described above. The server computer 1602F can also execute other components and/or to store data for providing some or all of the functionality described herein. In this regard, it should be appreciated that the services illustrated in FIG. 16 as executing on the server computer 1602F can execute on many other physical or virtual servers in the data centers 1504 in various configurations.

In the example data center 1504 shown in FIG. 16, an appropriate LAN 1606 is also utilized to interconnect the server computers 1602A-1402F. The LAN 1606 is also connected to the network 1502 illustrated in FIG. 15. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1504A-1304N, between each of the server computers 1602A-1402F in each data center 1504, and, potentially, between computing resources in each of the data centers 1504. It should be appreciated that the configuration of the data center 1504 described with reference to FIG. 16 is merely illustrative and that other implementations can be utilized.

Figure 17:
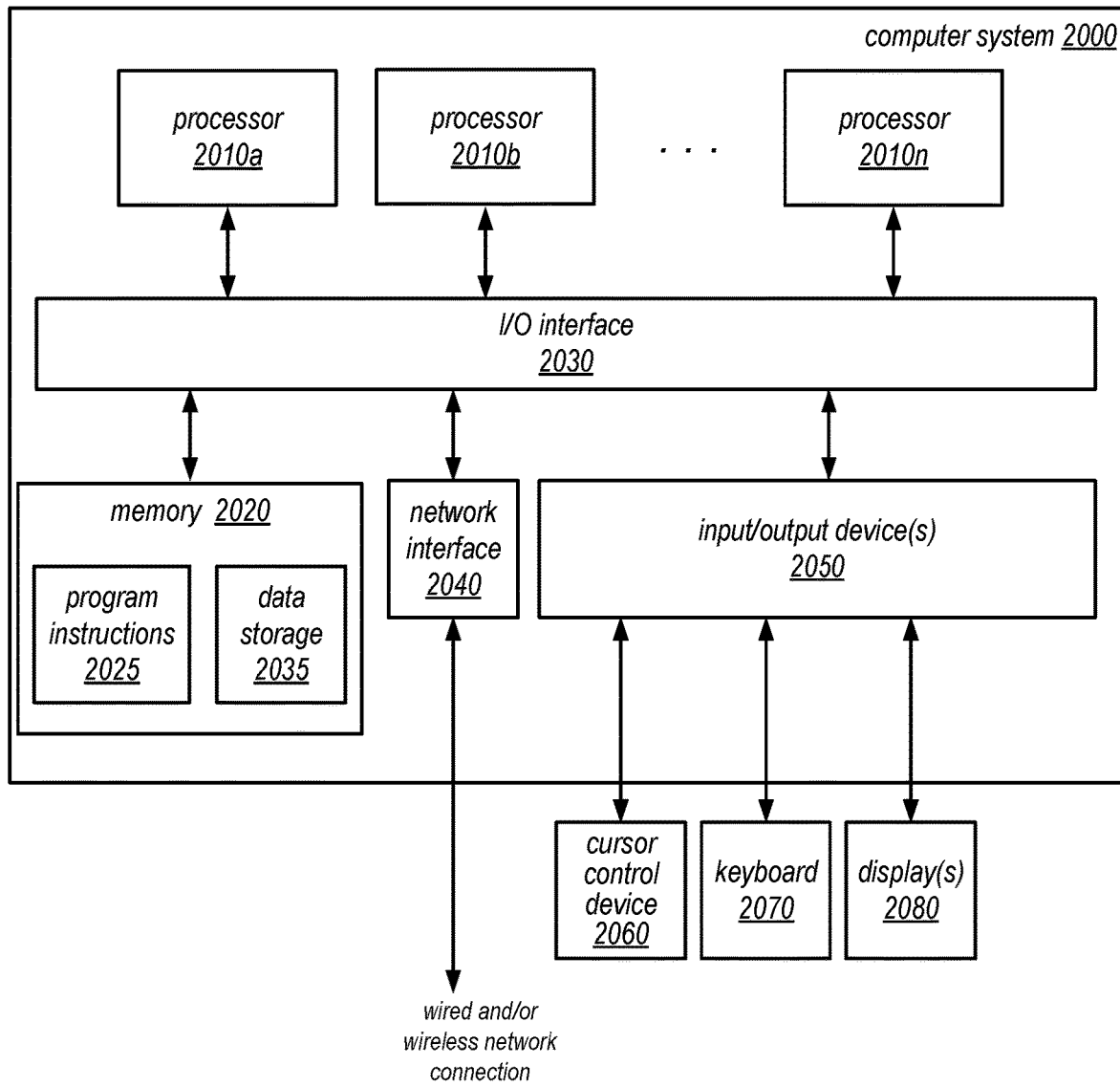
FIG. 17 illustrates an example system configured to implement the various methods, techniques, and systems described herein, according to some embodiments.

Embodiments of engine independent query plan optimization as described herein may be executed on one or more computer systems, which may interact with various other devices. One such computer system is illustrated by FIG. 17. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 17, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL))

corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
receive a request to generate an optimized plan to perform a query directed to a data set;
select a type of query engine to generate an initial plan to perform the query, wherein the initial plan is generated in an engine-specific format for the selected type of query engine;
translate the generated initial plan from the engine-specific format into a plan optimization format;
analyze the translated initial plan in the plan optimization format to generate an optimized plan in the plan optimization format, wherein the optimized plan in the plan optimization format is optimized for performance independent of the selected type of query engine;
translate the optimized plan in the plan optimization format to the engine-specific format; and
send the optimized plan in the engine-specific format to a resource to perform the query according to the optimized plan in the engine-specific format.

2. The system of claim 1, wherein the method further comprises: obtain one or more statistics for the data set; and translate the one or more statistics into the plan optimization format, wherein the analysis to generate the optimized plan is based, at least in part, on the one or more statistics.

3. The system of claim 1, wherein the analysis of the initial plan is based, at least in part, on a cost model, wherein the selection of the type of query engine, the translation of the generated initial plan, the analysis of the translated initial plan, and the translation of the optimized plan are performed for a plurality of other queries, and wherein the method further comprises: obtain performance costs for the other queries; determine one or more modifications to the cost model; apply the one or more modifications to update the cost model; and generate an optimized query plan for a subsequent query based, at least in part, on the updated cost model.

4. The system of claim 1, wherein the at least one processor is implemented as part of a query optimization service and wherein the request to generate the optimized query plan is received from a managed query service implemented as part of a provider network that also implements the query optimization service.

5. A computer-implemented method, comprising:
identifying, by at least one processor, a type of query engine to generate an initial plan to perform a query directed to a data set, wherein the initial plan is generated in an engine-specific format for the identified type of query engine;
translating, by the at least one processor, the generated initial plan from the engine-specific format into a plan optimization format;
analyzing, by the at least one processor, the translated initial plan in the plan optimization format to generate an optimized plan in the plan optimization format, wherein the optimized plan in the plan optimization format is optimized for performance independent of the identified type of query engine; and
translating, by the at least one processor, the optimized plan from the plan optimization format to the engine-specific format for performance of the query at a resource implementing the type of query engine with respect to the data set.

6. The method of claim 5, further comprising: obtaining one or more statistics for the data set; and translating the one or more statistics into the plan optimization format, wherein the analyzing generates the optimized plan is based, at least in part, on the one or more statistics.

7. The method of claim 5, further comprising: receiving a request to generate the optimized query plan for the query via network-based interface; and performing the identifying the type of query engine, the translating the generated initial plan, the analyzing the translated initial plan, and the translating the optimized plan in response to the request.

8. The method of claim 7, further comprising sending the optimized plan to the resource in response to a request from the resource to obtain a plan.

9. The method of claim 7, further comprising: parsing the query to determine that format of the query is valid; and further performing the identifying the type of query engine, the translating the generated initial plan, the analyzing the translated initial plan, and the translating the optimized plan in response to the determination that the format of the query is valid.

10. The method of claim 7, further comprising: receiving a request to generate an optimized plan for another query directed to the data set via the network-based interface; parsing the other query to determine that the other query is a metadata query for the data set; in response to determining that the other query is a metadata query for the data set: accessing metadata for the data set to perform the other query; and returning a result for the other query.

11. The method of claim 7, further comprising: receiving, via the network-based interface, a request to modify one or more stages of the optimized query plan from the resource; modifying the one or more stages according to one or more query optimization techniques; and sending the modified one or more stages to the resource via the network-based interface.

12. The method of claim 5, wherein the analyzing the translated initial plan is based, at least in part, on a cost model, wherein the identifying the type of query engine, the translating the generated initial plan, the analyzing the translated initial plan, and the translating the optimized plan are performed for a plurality of other queries, and wherein the method further comprises: obtaining performance costs for the other queries; determining one or more modifications to the cost model; applying the one or more modifications to update the cost model; and generating an optimized query plan for a subsequent query based, at least in part, on the updated cost model.

13. The method of claim 5, wherein the query is a sub-query of another query directed to a plurality of data sets including data asset, and wherein the performing the identifying the type of query engine, the translating the generated initial plan, the analyzing the translated initial plan, and the translating the optimized plan are performed for other sub-queries of the other query directed to different ones of the data sets to be performed at different respective resources implement one or more different types of query engine than the type of query engine identified for the query.

14. A non-transitory, computer-readable storage medium, storing program instructions that when executed by one or more computing devices cause the one or more computing devices to implement:
   identifying a type of query engine to generate an initial plan to perform a query directed to a data set;
   generating the initial plan in an engine-specific format for the identified type of query engine;
   translating the generated initial plan from the engine-specific format into a plan optimization format;
   analyzing the translated initial plan in the plan optimization format to generate an optimized plan in the plan optimization format, wherein the optimized plan in the plan optimization format is optimized for performance independent of the identified type of query engine; and
   translating the optimized plan from the plan optimization format to the engine-specific format for performance of the query at a resource implementing the type of query engine with respect to the data set.

15. The non-transitory, computer-readable storage medium of claim 14, wherein the program instructions cause the one or more computing devices to implement: obtaining one or more statistics for the data set; and translating the one or more statistics into the plan optimization format, wherein the analyzing generates the optimized plan is based, at least in part, on the statistics.

16. The non-transitory, computer-readable storage medium of claim 14, wherein the analyzing the translated initial plan is based, at least in part, on a cost model, wherein the identifying the type of query engine, the generating the initial plan, the translating the generated initial plan, the analyzing the translated initial plan, and the translating the optimized plan are performed for a plurality of other queries, and wherein the program instructions cause the one or more computing devices to further implement: obtaining performance costs for the other queries; determining one or more modifications to the cost model; applying the one or more modifications to update the cost model; and generating an optimized query plan for a subsequent query based, at least in part, on the updated cost model.

17. The non-transitory, computer-readable storage medium of claim 14, wherein the program instructions cause the one or more computing devices to implement: receiving, via a network-based interface, a request to modify one or more stages of the optimized query plan from the resource; modifying the one or more stages according to one or more query optimization techniques; and sending the modified one or more stages to the resource via the network-based interface.

18. The non-transitory, computer-readable storage medium of claim 14, further comprising: receiving a request to generate the optimized query plan for the query via network-based interface from a client; and performing the identifying the type of query engine, then generating the initial plan, the translating the generated initial plan, the analyzing the translated initial plan, the translating the optimized plan, and sending the optimized plan to the client via the network-based interface in response to the request.

19. The non-transitory, computer-readable storage medium of claim 18, further comprising: parsing the query to determine that schema for the data set included in the query is valid; and further performing the identifying the type of query engine, the translating the generated initial plan, the analyzing the translated initial plan, and the translating the optimized plan in response to the determination that the schema for the data set included in the query is valid.

20. The non-transitory; computer-readable storage medium of claim 18, wherein at least one processor is implemented as part of a query optimization service, wherein the request to generate the optimized query plan is received from another network-based service implemented as part of a provider network that also implements the query optimization service.

\* \* \* \* \*